(12) United States Patent
Chen et al.

(10) Patent No.: US 11,563,472 B2
(45) Date of Patent: Jan. 24, 2023

(54) CODEBOOK DESIGN WITH DIFFERENTIAL PHASE FEEDBACK IN FREQUENCY DOMAIN

(71) Applicant: Qualcomm Incorporated, San Diego, CA (US)

(72) Inventors: Bo Chen, Beijing (CN); Yuwei Ren, Beijing (CN); Renqiu Wang, San Diego, CA (US); Ruifeng Ma, Beijing (CN); Pavan Kumar Vitthaladevuni, San Diego, CA (US); Joseph Binamira Soriaga, San Diego, CA (US); Tingfang Ji, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/427,585

(22) PCT Filed: Jan. 31, 2020

(86) PCT No.: PCT/CN2020/074099
§ 371 (c)(1),
(2) Date: Jul. 30, 2021

(87) PCT Pub. No.: WO2020/156510
PCT Pub. Date: Aug. 6, 2020

(65) Prior Publication Data
US 2022/0123801 A1    Apr. 21, 2022

(30) Foreign Application Priority Data

Jan. 31, 2019    (CN) ................. PCT/CN2019/074170

(51) Int. Cl.
| | | |
|---|---|---|
| *H04B 7/0456* | (2017.01) | |
| *H04B 7/06* | (2006.01) | |
| *H04W 72/04* | (2009.01) | |

(52) U.S. Cl.
CPC ......... *H04B 7/0478* (2013.01); *H04B 7/0639* (2013.01); *H04B 7/0641* (2013.01); *H04B 7/0695* (2013.01); *H04W 72/044* (2013.01)

(58) Field of Classification Search
CPC .................................................. H04B 7/0478
(Continued)

(56) References Cited

U.S. PATENT DOCUMENTS 9,178,679 B2 * 11/2015 Chun .................... H04L 5/0091
9,729,220 B1    8/2017 Harel et al.
(Continued)

FOREIGN PATENT DOCUMENTS

| CN | 102804662 A | 11/2012 |
|---|---|---|
| CN | 108111200 A | 6/2018 |
| CN | 108809372 A | 11/2018 |

OTHER PUBLICATIONS

International Search Report and Written Opinion—PCT/CN2019/074170—ISA/EPO-dated Oct. 30, 2019.
(Continued)

*Primary Examiner* — Lihong Yu
(74) *Attorney, Agent, or Firm* — Holland & Hart LLP/Qualcomm Incorporated

(57) ABSTRACT

Methods, systems, and devices for wireless communications are described. In some systems, a user equipment (UE) may transmit feedback to a base station indicating phase values for sub-bands in a bandwidth part (BWP). The base station may use the phase feedback to perform precoding on a set of beams. To support a reduced payload overhead for the feedback, the UE may implement differential phase feed-
(Continued)

back. For example, the UE may divide the BWP into a number of sub-band groups and may generate, for each sub-band group of each beam, a first set of bits indicating an absolute phase value for a first sub-band of the sub-band group. The UE may additionally generate a second set of bits indicating differential phase values for the other sub-bands of each sub-band group. The UE may report the first and second sets of bits for the beams to the base station for precoding.

22 Claims, 17 Drawing Sheets

(58) Field of Classification Search
USPC .......................................................... 375/267
See application file for complete search history.

(56) References Cited

U.S. PATENT DOCUMENTS

2013/0267268 A1 10/2013 Lee et al.
2018/0262246 A1* 9/2018 Faxér ..................... H04B 7/063

OTHER PUBLICATIONS

International Search Report and Written Opinion—PCT/CN2020/074099—ISA/EPO—dated Oct. 30, 2020.
ZTE: "CSI Enhancement for MU-MIMO Support", 3GPP TSG RAN WG1 Meeting #95, RI-1812255, Spokane, USA, Nov. 12, 2018-Nov. 16, 2018,Nov. 16, 2018, 9 pages, sections 2-3.
Supplementary European Search Report—EP20749212—Search Authority—the Hague—dated Aug. 30, 2022.

* cited by examiner

CODEBOOK DESIGN WITH DIFFERENTIAL PHASE FEEDBACK IN FREQUENCY DOMAIN

CROSS REFERENCE TO RELATED APPLICATIONS

The present Application is a 371 national phase filing of International Patent Application No. PCT/CN2020/074099 by Ren et. al., entitled "CODEBOOK DESIGN WITH DIFFERENTIAL PHASE FEEDBACK IN FREQUENCY DOMAIN," filed Jan. 31, 2020; and to International Patent Application No. PCT/CN2019/074170 by Ren et. al., entitled "CODEBOOK DESIGN WITH DIFFERENTIAL PHASE FEEDBACK IN FREQUENCY DOMAIN," filed Jan. 31, 2019, each of which is assigned to the assignee hereof, and each of which is expressly incorporated by reference in its entirety herein.

BACKGROUND

The following relates generally to wireless communications, and more specifically to codebook design with differential phase feedback in a frequency domain.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices may perform beamforming to shape or steer an antenna beam along a spatial path from a transmitting wireless device to a receiving wireless device. In some cases, performing beamforming may involve the transmitting wireless device constructing a precoding matrix based on feedback received from the receiving wireless device and precoding transmissions based on the precoding matrix. This precoding procedure may define how the beams are constructed using the different antenna elements of an antenna array at the transmitting wireless device. The amount of feedback received from the receiving wireless device may increase in size linearly with the number of sub-bands over which a beamformed transmission is transmitted. As the amount of feedback increases, the overhead of providing the feedback may result in reduced efficiency or excess latency in the communications for the wireless device.

SUMMARY

The described techniques relate to improved methods, systems, devices, and apparatuses that support differential phase feedback in the frequency domain for a beam combination codebook, such as a new radio (NR) Type II codebook. Generally, the described techniques provide for reducing feedback overhead of channel state information (CSI). For example, a user equipment (UE) may implement differential phase feedback to reduce the overhead of transmitting feedback of sub-band phase values or to improve the frequency domain feedback granularity without a significant increase in the feedback overhead.

To support differential phase feedback, the UE may divide a bandwidth part (BWP) for reporting into sub-band groups and may report phase values for sub-bands within a sub-band group according to one or more reference values. For example, the UE, in the CSI feedback, may indicate an absolute phase value for a first sub-band within each sub-band group and may indicate a differential phase value for the remaining sub-bands within each sub-band group. The number of bits to indicate a differential phase value may be fewer than the number of bits to indicate the absolute phase value (e.g., three bits may indicate up to eight different absolute phase values for a first sub-band and one bit may indicate whether to increase or decrease a reference phase value by a differential phase value for the remaining sub-bands of a sub-band group). In some cases, the reference phase value in a sub-band group may be the absolute phase value, while in other cases the reference phase value for each sub-band may be a preceding sub-band—according to ordered indices of the sub-bands—in the sub-band group. The UE may reduce the feedback overhead or may limit an increase in the payload size of the feedback when narrowing the frequency granularity by indicating differential phase values, rather than absolute phase values, for a subset of sub-bands.

A method for wireless communications at a UE is described. The method may include determining a set of beams for reporting feedback according to a beam combination codebook for precoding by a base station, generating, for a beam of the set of beams, a first set of bits indicating an absolute phase value for a first sub-band of a sub-band group, where the sub-band group includes the first sub-band and one or more additional sub-bands, generating a second set of bits indicating differential phase values for the one or more additional sub-bands of the sub-band group, and transmitting, to the base station, an indication of the first set of bits and the second set of bits.

An apparatus for wireless communications at a UE is described. The apparatus may include a processor, memory in electronic communication with the processor, and instructions stored in the memory. The instructions may be executable by the processor to cause the apparatus to determine a set of beams for reporting feedback according to a beam combination codebook for precoding by a base station, generate, for a beam of the set of beams, a first set of bits indicating an absolute phase value for a first sub-band of a sub-band group, where the sub-band group includes the first sub-band and one or more additional sub-bands, generate a second set of bits indicating differential phase values for the one or more additional sub-bands of the sub-band group, and transmit, to the base station, an indication of the first set of bits and the second set of bits.

Another apparatus for wireless communications at a UE is described. The apparatus may include means for determining a set of beams for reporting feedback according to a beam combination codebook for precoding by a base station, generating, for a beam of the set of beams, a first set of bits indicating an absolute phase value for a first sub-band of a sub-band group, where the sub-band group includes the first sub-band and one or more additional sub-bands, generating a second set of bits indicating differential phase values for the one or more additional sub-bands of the sub-band group, and transmitting, to the base station, an indication of the first set of bits and the second set of bits.

A non-transitory computer-readable medium storing code for wireless communications at a UE is described. The code may include instructions executable by a processor to determine a set of beams for reporting feedback according to a beam combination codebook for precoding by a base station, generate, for a beam of the set of beams, a first set of bits indicating an absolute phase value for a first sub-band of a sub-band group, where the sub-band group includes the first sub-band and one or more additional sub-bands, generate a second set of bits indicating differential phase values for the one or more additional sub-bands of the sub-band group, and transmit, to the base station, an indication of the first set of bits and the second set of bits.

In some examples of the method, apparatuses, and non-transitory computer-readable medium described herein, the second set of bits includes, for each sub-band of the one or more additional sub-bands, one bit indicating whether to increase or decrease a reference phase value by a differential phase value to determine a phase value for the each sub-band.

Some examples of the method, apparatuses, and non-transitory computer-readable medium described herein may further include operations, features, means, or instructions for generating a third set of bits indicating the differential phase value and transmitting, to the base station, an indication of the third set of bits.

In some examples of the method, apparatuses, and non-transitory computer-readable medium described herein, the reference phase value includes the absolute phase value for the first sub-band.

In some examples of the method, apparatuses, and non-transitory computer-readable medium described herein, the reference phase value includes a phase value for a preceding sub-band or a subsequent sub-band in the sub-band group according to an order of sub-band indices for the sub-band group.

In some examples of the method, apparatuses, and non-transitory computer-readable medium described herein, for a first subset of the one or more additional sub-bands, the reference phase value includes a phase value for a preceding sub-band in the sub-band group according to an order of sub-band indices for sub-band group and, for a second subset of the one or more additional sub-bands, the reference phase value includes a phase value for a subsequent sub-band in the sub-band group according to the order of the sub-band indices for the sub-band group.

Some examples of the method, apparatuses, and non-transitory computer-readable medium described herein may further include operations, features, means, or instructions for transmitting, to the base station, an indication of whether the reference phase value includes the absolute phase value for the first sub-band or a phase value for an adjacent sub-band in the sub-band group.

Some examples of the method, apparatuses, and non-transitory computer-readable medium described herein may further include operations, features, means, or instructions for generating one or more additional first sets of bits indicating additional absolute phase values for first sub-bands of one or more additional sub-band groups of a set of sub-band groups, generating one or more additional second sets of bits indicating differential phase values for additional sub-bands of the one or more additional sub-band groups of the set of sub-band groups, and transmitting, to the base station, an indication of the one or more additional first sets of bits and the one or more additional second sets of bits.

Some examples of the method, apparatuses, and non-transitory computer-readable medium described herein may further include operations, features, means, or instructions for transmitting, to the base station, an indication of a number of sub-band groups in the set of sub-band groups.

In some examples of the method, apparatuses, and non-transitory computer-readable medium described herein, the indication of the number of sub-band groups includes a bit field indicating either one sub-band group or a plurality of sub-band groups, wherein a sub-band group size relative to a bandwidth part size is based at least in part on a value of the bit field.

In some examples of the method, apparatuses, and non-transitory computer-readable medium described herein, a number of sub-band groups in the set of sub-band groups may be configured by the base station.

Some examples of the method, apparatuses, and non-transitory computer-readable medium described herein may further include operations, features, means, or instructions for calculating a set of phase values for a set of resource blocks corresponding to a frequency region, calculating differences in the phase values for resource blocks in the set of resource blocks, and selecting a number of sub-band groups in the set of sub-band groups based on the calculated differences in the phase values and a phase difference threshold.

Some examples of the method, apparatuses, and non-transitory computer-readable medium described herein may further include operations, features, means, or instructions for transmitting, to the base station, an indication of whether a frequency domain granularity for phase feedback may be smaller than a frequency domain granularity for amplitude feedback.

Some examples of the method, apparatuses, and non-transitory computer-readable medium described herein may further include operations, features, means, or instructions for receiving, from the base station, an indication to use a frequency domain granularity for phase feedback that may be smaller than a frequency domain granularity for amplitude feedback.

Some examples of the method, apparatuses, and non-transitory computer-readable medium described herein may further include operations, features, means, or instructions for receiving, from the base station, a configuration to implement differential phase feedback, where the generating the second set of bits may be based on the configuration to implement differential phase feedback.

In some examples of the method, apparatuses, and non-transitory computer-readable medium described herein, the configuration may be received in radio resource control signaling, medium access control element signaling, or a combination thereof.

In some examples of the method, apparatuses, and non-transitory computer-readable medium described herein, the first sub-band is a lowest frequency sub-band of the sub-band group or a highest frequency sub-band of the sub-band group.

In some examples of the method, apparatuses, and non-transitory computer-readable medium described herein, the first sub-band is subsequent to a first subset of the one or more additional sub-bands according to an order of sub-band indices for the sub-band group, where a second subset of one or more of the one or more additional sub-bands are subsequent to the first sub-band according to the order of the sub-band indices for sub-band group, and where a difference between a number of sub-bands in the first subset and a number of sub-bands in the second subset is no more than one.

A method for wireless communications at a base station is described. The method may include receiving, from a UE, an indication of a first set of bits and a second set of bits, where the first set of bits indicates, for a beam of a set of beams, an absolute phase value for a first sub-band of a sub-band group and the second set of bits indicates differential phase values for one or more additional sub-bands of the sub-band group, where the sub-band group includes the first sub-band and the one or more additional sub-bands, performing a precoding procedure for the set of beams using at least the first set of bits, the second set of bits, and a beam combination codebook, and communicating with the UE according to the precoding procedure.

An apparatus for wireless communications at a base station is described. The apparatus may include a processor, memory in electronic communication with the processor, and instructions stored in the memory. The instructions may be executable by the processor to cause the apparatus to receive, from a UE, an indication of a first set of bits and a second set of bits, where the first set of bits indicates, for a beam of a set of beams, an absolute phase value for a first sub-band of a sub-band group and the second set of bits indicates differential phase values for one or more additional sub-bands of the sub-band group, where the sub-band group includes the first sub-band and the one or more additional sub-bands, perform a precoding procedure for the set of beams using at least the first set of bits, the second set of bits, and a beam combination codebook, and communicate with the UE according to the precoding procedure.

Another apparatus for wireless communications at a base station is described. The apparatus may include means for receiving, from a UE, an indication of a first set of bits and a second set of bits, where the first set of bits indicates, for a beam of a set of beams, an absolute phase value for a first sub-band of a sub-band group and the second set of bits indicates differential phase values for one or more additional sub-bands of the sub-band group, where the sub-band group includes the first sub-band and the one or more additional sub-bands, performing a precoding procedure for the set of beams using at least the first set of bits, the second set of bits, and a beam combination codebook, and communicating with the UE according to the precoding procedure.

A non-transitory computer-readable medium storing code for wireless communications at a base station is described. The code may include instructions executable by a processor to receive, from a UE, an indication of a first set of bits and a second set of bits, where the first set of bits indicates, for a beam of a set of beams, an absolute phase value for a first sub-band of a sub-band group and the second set of bits indicates differential phase values for one or more additional sub-bands of the sub-band group, where the sub-band group includes the first sub-band and the one or more additional sub-bands, perform a precoding procedure for the set of beams using at least the first set of bits, the second set of bits, and a beam combination codebook, and communicate with the UE according to the precoding procedure.

In some examples of the method, apparatuses, and non-transitory computer-readable medium described herein, the second set of bits includes, for each sub-band of the one or more additional sub-bands, one bit indicating whether to increase or decrease a reference phase value by a differential phase value to determine a phase value for the each sub-band.

Some examples of the method, apparatuses, and non-transitory computer-readable medium described herein may further include operations, features, means, or instructions for receiving, from the UE, an indication of a third set of bits indicating the differential phase value, where the precoding procedure may be performed based on the differential phase value.

In some examples of the method, apparatuses, and non-transitory computer-readable medium described herein, the reference phase value includes the absolute phase value for the first sub-band.

In some examples of the method, apparatuses, and non-transitory computer-readable medium described herein, the reference phase value includes a phase value for a preceding sub-band or a subsequent sub-band in the sub-band group according to an order of sub-band indices for the sub-band group.

In some examples of the method, apparatuses, and non-transitory computer-readable medium described herein, for a first subset of the one or more additional sub-bands, the reference phase value includes a phase value for a preceding sub-band in the sub-band group according to an order of sub-band indices for sub-band group and, for a second subset of the one or more additional sub-bands, the reference phase value includes a phase value for a subsequent sub-band in the sub-band group according to the order of the sub-band indices for the sub-band group.

Some examples of the method, apparatuses, and non-transitory computer-readable medium described herein may further include operations, features, means, or instructions for receiving, from the UE, an indication of whether the reference phase value includes the absolute phase value for the first sub-band or a phase value for a preceding sub-band in the sub-band group.

Some examples of the method, apparatuses, and non-transitory computer-readable medium described herein may further include operations, features, means, or instructions for receiving, from the UE, an indication of one or more additional first sets of bits and one or more additional second sets of bits, where the one or more additional first sets of bits indicate additional absolute phase values for first sub-bands of one or more additional sub-band groups of a set of sub-band groups and the one or more additional second sets of bits indicate differential phase values for additional sub-bands of the one or more additional sub-band groups of the set of sub-band groups.

Some examples of the method, apparatuses, and non-transitory computer-readable medium described herein may further include operations, features, means, or instructions for receiving, from the UE, an indication of a number of sub-band groups in the set of sub-band groups.

In some examples of the method, apparatuses, and non-transitory computer-readable medium described herein, the indication of the number of sub-band groups includes a bit field indicating either one sub-band group or a plurality of sub-band groups, wherein a sub-band group size relative to a bandwidth part size is based at least in part on a value of the bit field.

Some examples of the method, apparatuses, and non-transitory computer-readable medium described herein may further include operations, features, means, or instructions for transmitting, to the UE, a configuration of a number of sub-band groups in the set of sub-band groups.

Some examples of the method, apparatuses, and non-transitory computer-readable medium described herein may further include operations, features, means, or instructions for receiving, from the UE, an indication of whether a frequency domain granularity for phase feedback may be smaller than a frequency domain granularity for amplitude feedback.

Some examples of the method, apparatuses, and non-transitory computer-readable medium described herein may further include operations, features, means, or instructions for transmitting, to the UE, an indication to use a frequency domain granularity for phase feedback that may be smaller than a frequency domain granularity for amplitude feedback.

Some examples of the method, apparatuses, and non-transitory computer-readable medium described herein may further include operations, features, means, or instructions for transmitting, to the UE, a configuration to implement differential phase feedback, where the receiving the indication of the second set of bits may be based on the configuration to implement differential phase feedback.

In some examples of the method, apparatuses, and non-transitory computer-readable medium described herein, the configuration may be transmitted in radio resource control signaling, medium access control element signaling, or a combination thereof.

In some examples of the method, apparatuses, and non-transitory computer-readable medium described herein, the first sub-band is a lowest frequency sub-band of the sub-band group or a highest frequency sub-band of the sub-band group.

In some examples of the method, apparatuses, and non-transitory computer-readable medium described herein, the first sub-band is subsequent to a first subset of the one or more additional sub-bands according to an order of sub-band indices for the sub-band group, where a second subset of one or more of the one or more additional sub-bands are subsequent to the first sub-band according to the order of the sub-band indices for sub-band group, and where a difference between a number of sub-bands in the first subset and a number of sub-bands in the second subset is no more than one.

DETAILED DESCRIPTION

Figure 1:
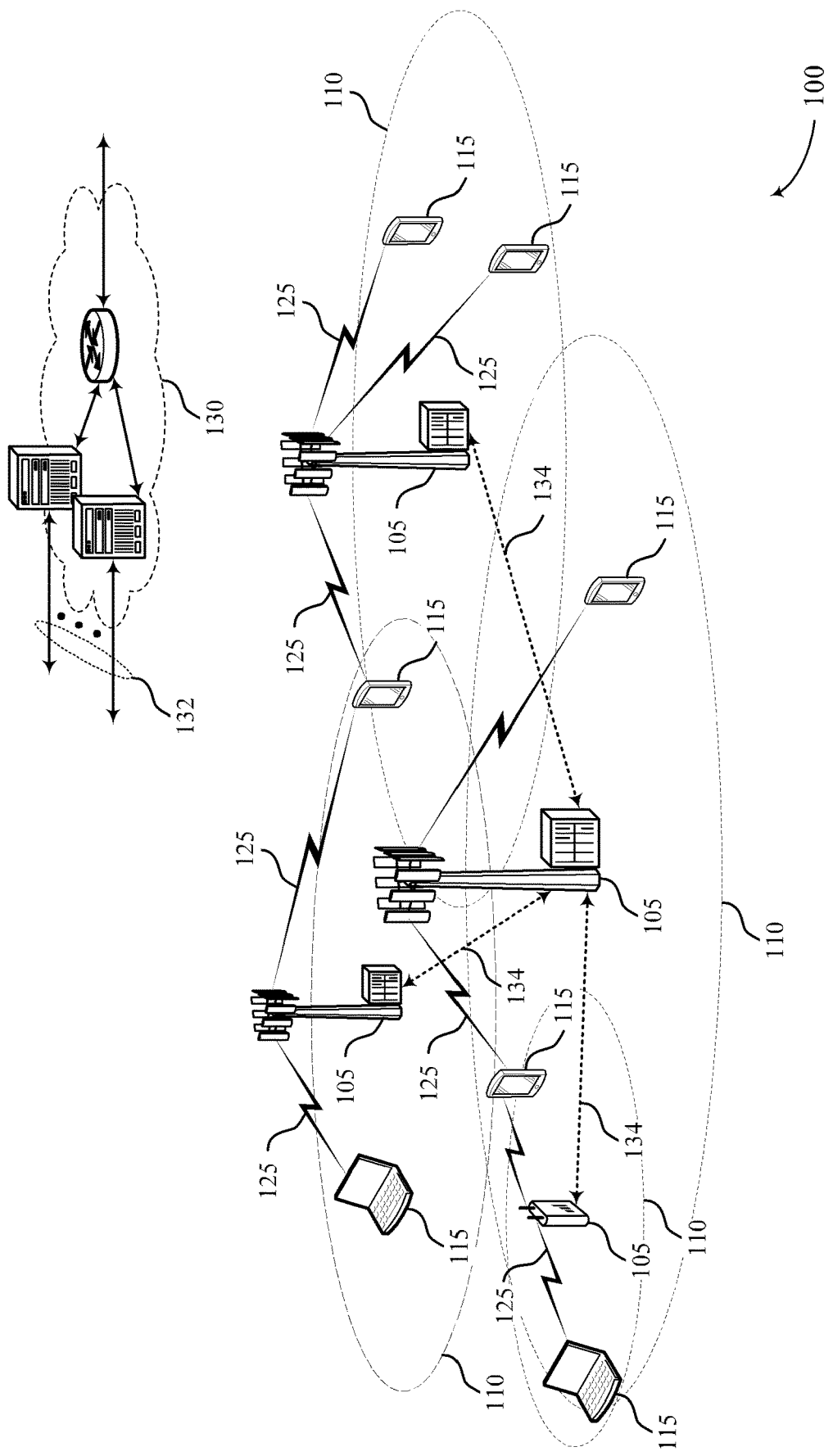
FIGS. 1 and 2 illustrate examples of wireless communications systems that support codebook design with differential phase feedback in a frequency domain in accordance with aspects of the present disclosure.

In some wireless communications systems (e.g., multiple input-multiple output (MIMO) or multi-user MIMO (MU-MIMO) systems), a user equipment (UE) may report channel state information (CSI) feedback to a base station for multiple discrete Fourier transform (DFT) beams. The frequency domain of the DFT beams may span a bandwidth part (BWP), which may include one or more sub-bands according to a granularity configured at the UE or the base station. Based on the CSI feedback, the base station may construct a precoding matrix and may precode transmissions over the multiple DFT beams. In some cases, the CSI feedback may include bit representations for a number of precoding coefficients (e.g., a wide-band amplitude scaling factor, a sub-band amplitude scaling factor, a beam combination coefficient corresponding to a phase value, etc.) with respect to a particular beam, polarity, and layer number. Additionally, for a subset of the precoding coefficients (e.g., sub-band amplitude scaling factor and beam combination coefficient), the CSI feedback may include a bit representation for each reporting sub-band of the BWP.

In some cases, a base station and a UE may communicate according to a first sub-band granularity. To support this sub-band granularity, the UE may report CSI feedback (e.g., including phase feedback) for these sub-bands using a first feedback payload size. For the base station and UE to communicate using a sub-band granularity finer than the first sub-band granularity (e.g., where the BWP includes additional reporting sub-bands at this finer granularity), the UE transmits additional information in the CSI feedback associated with these additional sub-bands. The fields in the CSI feedback, including the bit representations of the coefficients that are reported per sub-band (e.g., the sub-band scaling factor and beam combining coefficient), may include a fixed number of bits for each sub-band (e.g., for phase values, two bits per sub-band for quadrature phase shift keying (QPSK) and three bits per sub-band for eight phase shift keying (8PSK)). As such, the size of these fields may increase linearly with the increase in the number of sub-bands and may, correspondingly, be associated with an increase to the first payload size of the CSI feedback. In some cases, this increased payload size may be greater than a threshold payload size (e.g., a total payload size limit for CSI feedback), limiting the frequency granularity for reporting.

To reduce the effects of this linear increase, a UE may implement differential phase feedback to lower the overhead of phase reporting. In differential phase feedback, the bits representing values of beam combining coefficients may include a combination of absolute phase feedback and differential phase feedback. Absolute phase feedback may be an indication of an absolute phase value for a combining coefficient while differential phase feedback may be an indication of a phase value relative to the absolute phase value or another reference phase value (e.g., a phase value for an adjacent sub-band). For example, the UE may report an absolute phase value for a sub-band using three bits and differential phase values using one bit for each of the remaining sub-bands (e.g., where the one bit indicates whether to increase (e.g., add) or decrease (e.g., subtract) the differential phase value from a reference phase value, such as the absolute phase value, a phase value of the preceding sub-band by index in the sub-band group, etc.). To determine for which sub-bands to report absolute phase feedback and for which to report differential phase feedback, the BWP may be broken up into sub-band groups. The UE may report absolute phase feedback for one sub-band in a given sub-band group and may report differential phase feedback for the rest of the sub-bands in the sub-band group. As reporting differential phase feedback uses fewer bits than reporting absolute phase feedback for each sub-band, the UE may reduce the CSI reporting overhead. This feedback overhead reduction may support finer reporting sub-band granularities without the CSI feedback exceeding the threshold payload size (e.g., the total payload size limit for CSI feedback).

Aspects of the disclosure are initially described in the context of a wireless communications system. Aspects of the disclosure are additionally described in the context of an additional wireless communications system, sub-band grouping schemes, and a process flow. Aspects of the disclosure are further illustrated by and described with reference to apparatus diagrams, system diagrams, and flowcharts that relate to differential phase feedback in the frequency domain for a beam combination codebook, such as a new radio (NR) Type II codebook.

FIG. 1 illustrates an example of a wireless communications system 100 that supports codebook design with differential phase feedback in a frequency domain in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and MU-MIMO where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, a base station 105 may precode one or more transmissions to a UE 115 according to a precoding matrix indicator (PMI) codebook used for spatial channel information feedback. The base station 105 may use a specific PMI codebook format based on the rank of the one or more transmissions. For example, if the transmissions have a rank of 1, the precoding matrix W may be a 2×1 matrix equal to a spatial domain compression matrix $W_1$ multiplied by a coefficient matrix $W_2$, where W may be normalized to 1. If the transmissions have a rank of 2, the precoding matrix may be a 2×2 matrix equal to a spatial domain compression matrix $W_1$ multiplied by a coefficient matrix $W_2$, where columns of W may be normalized to $1/\sqrt{2}$.

In general, the precoding matrix W may be a l×r matrix, where l corresponds to a number of layers and r corresponds to rank, that has entries $\tilde{w}_{r,l}$. The base station 105 may determine the precoding matrix (i.e., the precoder) according to $\tilde{w}_{r,l} = \sum_{i=0}^{L-1} b_{k_1^{(i)}, k_2^{(i)}} p_{r,l,i}^{(WB)} \cdot p_{r,l,i}^{(SB)} \cdot c_{r,l,i}$, where L may correspond to a total number of transmission beams, $b_{k_1,k_2}$ may correspond to an oversampled two-dimensional (2D) DFT beam, $p_{r,l,i}^{(WB)}$ may correspond to a wideband amplitude scaling factor, $p_{r,l,i}^{(SB)}$ may correspond to a sub-band amplitude scaling factor, and $c_{r,l,i}$ may correspond to a beam combining coefficient. In some cases, L may be configurable (e.g., $L \in \{2,3,4\}$). Additionally or alternatively, an amplitude scaling mode may be configured (e.g., by the base station 105) as either a wideband and sub-band mode (e.g., with unequal bit allocation) or a wideband-only mode.

The methods disclosed herein may enable a UE 115 and a base station 105 to limit the payload size for CSI feedback, such as when the UE 115 and the base station 105 are utilizing differential phase feedback in the frequency domain for an NR Type II codebook. In some cases, a UE 115 may determine a set of beams for reporting feedback according to a beam combination codebook (e.g., an NR Type II codebook) for precoding by a base station. The UE 115 may generate, for a beam of the set of beams, a first set of bits indicating an absolute phase value for a first sub-band of a sub-band group, where the sub-band group includes the first sub-band and one or more additional sub-bands. The UE 115 may additionally generate, for the beam of the set of beams, a second set of bits indicating differential phase values for the one or more additional sub-bands of the sub-band group. The UE 115 may transmit an indication of the first set of bits and the second set of bits to a base station 105. The base station 105 may receive the indication and may perform a precoding procedure for the set of beams using at least the first set of bits, the second set of bits, and the beam combination codebook. The base station 105 may communicate with the UE 115 according to the precoding procedure (e.g., using a precoding matrix resulting from the CSI feedback that includes the absolute and differential phase values).

Figure 2:
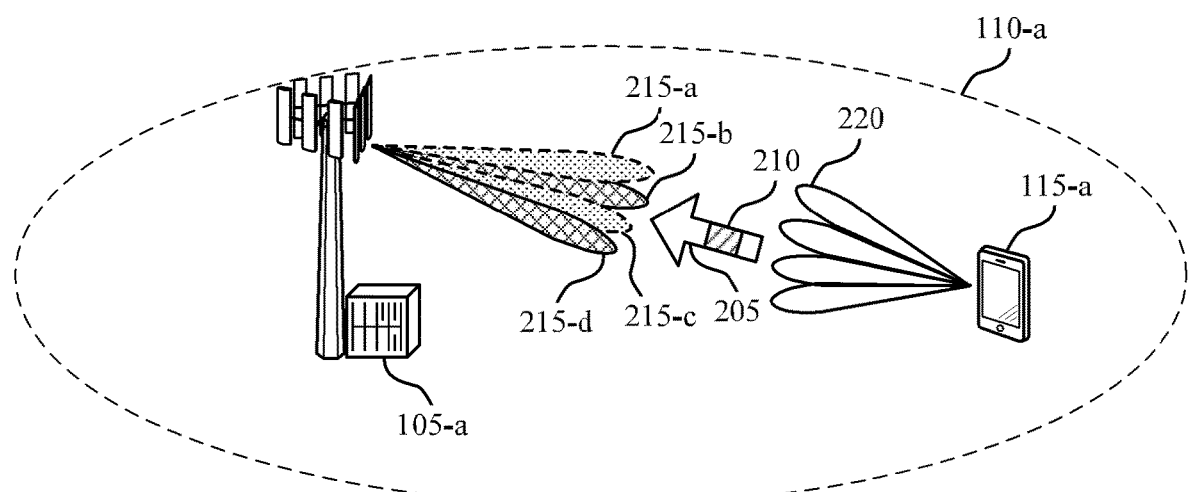

FIG. 2 illustrates an example of a wireless communications system 200 that supports codebook design with differential phase feedback in a frequency domain in accordance with aspects of the present disclosure. In the example of FIG. 2, wireless communications system 200 may include base station 105-*a* and UE 115-*a*, which may be examples of the corresponding devices described with respect to FIG. 1. Base station 105-*a* may provide network coverage for geographic coverage area 110-*a*. To support MIMO communications between base station 105-*a* and UE 115-*a*, UE 115-*a* may transmit CSI feedback 210 to base station 105-*a* on an uplink channel 205. For example, UE 115-*a* may transmit spatial channel information feedback in the CSI feedback 210.

UE 115-*a* may measure one or more CSI reference signals from base station 105-*a* at one or more antenna ports. UE 115-*a* may utilize CSI measurements from the one or more antenna ports to determine one or more coefficients (e.g., a wideband beam amplitude scaling factor, a sub-band beam amplitude scaling factor, a beam combining coefficient, etc.) corresponding to a precoding matrix W and to generate a bit representation of each coefficient. Each coefficient may be associated with a set of possible coefficient values for different beam, polarity, and layer combinations. In general, the set of beams for which UE 115-*a* generates the coefficients may be chosen by UE 115-*a* based on a beam combination codebook. Additionally, some of these coefficients (e.g., sub-band beam amplitude scaling factor and beam combining coefficient) and their corresponding bit representations may vary according to a number of reporting sub-bands within a BWP. As such, the set of possible values for such coefficients may further include coefficient values for each reporting sub-band. UE 115-*a* may include bit representations of these sets of coefficient values for each coefficient in the CSI feedback 210 transmitted to base station 105-*a*.

In one example, UE 115-a may determine a wideband amplitude scaling factor $p_{r,l,i}^{(WB)}$ for each beam i, polarity r, and layer l. The wideband amplitude scaling factor $p_{r,l,i}^{(WB)}$ may represent an average amplitude of a beam over all reporting sub-bands and may be represented in the CSI feedback 210 by three (3) bits (e.g., $p_{r,l,i}^{(WB)} \in \{1, \sqrt{0.5}, \sqrt{0.25}, \sqrt{0.125}, \sqrt{0.0625}, \sqrt{0.0313}, \sqrt{0.0156}, 0\}$). Additionally or alternatively, UE 115-a may determine, for each sub-band, a sub-band amplitude scaling factor $p_{r,l,i}^{(SB)}$ for each beam i, polarity r, and layer l. A sub-band amplitude scaling factor $p_{r,l,i}^{(SB)}$ may represent an amplitude of a beam over a particular reporting sub-band and may be represented in the CSI feedback 210 by one (1) bit (e.g., $p_{r,l,i}^{(SB)} \in \{1, \sqrt{0.5}\}$). Additionally or alternatively, UE 115-a may determine, for each sub-band, a beam combining coefficient $c_{r,l,i}$ for each beam i, polarity r, and layer l. A beam combining coefficient $c_{r,l,i}$ may represent a phase of a beam over a particular reporting sub-band and may be represented in the CSI feedback 210 by two (2) bits (e.g., to indicate 1 of four (4) phase values if using QPSK) or 3 bits (e.g., to indicate one of eight (8) phase values if using 8PSK). If represented by 2 bits, the beam combining coefficient $c_{r,l,i}$ may equal $$e^{j\frac{\pi n}{2}}$$

for n=0, 1, 2, 3 and if represented by 3 bits, the combining coefficient $c_{r,l,i}$ may equal $$e^{j\frac{\pi n}{4}}$$

for n=0, 1, . . . , 7.

Base station 105-a may use the bit representation of the coefficients in conjunction with layer, polarity, and/or beam information (e.g., beam information as determined from a beam combination codebook) to calculate a precoding matrix W (e.g., as described with reference to FIG. 1). For example, base station 105-a may determine to communicate with UE 115-a over L base station beams 215 (e.g., base station beams 215-b and 215-d) and may forgo communicating with UE 115-a over other potential base station beams 215 (e.g., base station beams 215-a and 215-c) As such, base station 105-b may identify coefficient values corresponding to the L beams from the CSI feedback 210 and may use those values when calculating precoding matrix W. The L base station beams 215 may be selected from a set of oversampled DFT beams such that each of the L base station beams 215 are orthogonal to each other. In one example, base station beams 215-b and 215-d may be orthogonal to one another, but may not be orthogonal to base station beams 215-a and/or 215-c. Upon calculating precoding matrix W, base station 105-a may select a precoder from a codebook to use for precoding transmissions to UE 115-a, where the precoder is associated with the calculated precoding matrix. Base station 105-a may communicate with UE 115-a using base station beams 215-b and 215-d and one or more UE beams 220.

For a given bandwidth of an active BWP (e.g., the BWP over which base station 105-a is to communicate with UE 115-a), UE 115-a may be configured (e.g., by a base station 105, such as base station 105-a) with a sub-band size via higher layer signaling (e.g., RRC or MAC signaling). For example, if UE 115-a is receiving transmissions from base station 105-a over a carrier BWP of thirty-two (32) physical resource blocks (PRBs), UE 115-a may be configured with a sub-band size within that BWP of either 4 PRBs or 8 PRBs. If UE 115-a is configured with the former sub-band size, UE 115-a may determine that the BWP contains 8 reporting sub-bands and if UE 115-a is configured with the latter sub-band size, UE 115-a may determine that the BWP contains 4 reporting sub-bands. In general, UE 115-a may be configured such that the maximum number of reporting sub-bands is less than a threshold number (e.g., eighteen (18)) based on a maximum granularity (e.g., a minimum sub-band size or maximum number of reporting sub-bands) and a variance of the minimum sub-band size with BWP size. For example, the maximum granularity (e.g., minimum sub-band size) of a BWP from twenty-four (24) to seventy-two (72) PRBs may be 4 PRBs. As such, a BWP of 72 PRBs, where UE 115-a is configured with a sub-band size of 4 PRBs, may be associated with 18 reporting sub-bands (e.g., (72/4)=18). If the BWP increases beyond 72, the maximum granularity may be reduced (e.g., to 8 PRBs) such that there are no more than 18 sub-bands in the BWP.

In some cases, the maximum granularity and, by extension, the number of reporting sub-bands may be limited by a payload size threshold, which may prevent excessive overhead in the CSI feedback 210. For example, the payload size threshold may indicate a maximum payload size for CSI feedback 210 such that the CSI feedback 210 may be performed by low tier UEs 115. CSI feedback 210 may contain bit representations for certain coefficients (e.g., sub-band amplitude scaling factor $p_{r,l,i}^{(SB)}$ and beam combining coefficient $c_{r,l,i}$) for each sub-band. As such, increasing the number of sub-bands may linearly increase the number of bits that the CSI feedback 210 contains for these coefficients and, accordingly, increases the payload size. For example, doubling the number of sub-bands may double the number of bits used for indicating phase values in the CSI feedback 210. To support UE 115-a and base station 105-a using a finer granularity (e.g., smaller sub-bands, resulting in a greater number of sub-bands for a given BWP) while limiting an increase in the feedback overhead, the wireless communications system 200 may implement differential phase feedback. Additionally or alternatively, UE 115-a and base station 105-a may decrease CSI feedback 210 overhead for a given frequency granularity using differential phase feedback.

Differential phase feedback may involve UE 115-a limiting an increase in a payload size of CSI feedback 210 or decreasing CSI feedback 210 overhead for a given granularity by conveying the beam combining coefficient $c_{r,l,i}$ through a combination of absolute and differential phase feedback values. Absolute phase feedback may be feedback representing an absolute phase value (e.g., $$e^{j\frac{\pi n}{4}}$$

for one of n=0, 1, . . . , 6, or 7) while differential phase feedback may be feedback representing a phase value in relation to another phase value (e.g., a reference phase value). Rather than use a same number of bits (e.g., 2 bits for QPSK, 3 bits for 8PSK, etc.) representing an absolute phase value to convey the combining coefficient $c_{r,l,i}$ for each sub-band, UE 115-a may use different numbers of bits to represent the phase values for different sub-bands. As such, increasing the number of reporting sub-bands by 1 may result in an increase of 1 bit in the feedback payload (e.g., to indicate a differential phase value) rather than an increase of 3 bits in the feedback payload (e.g., for systems implementing absolute phase values). This bit reduction for representing the combining coefficient $c_{r,l,i}$ of each sub-band may result in significant payload reduction in cases with large numbers of sub-bands represented using differential phase values. Whether UE 115-*a* reports legacy phase feedback (e.g., absolute feedback for each sub-band) or differential phase feedback via the CSI feedback 210 may depend on a configuration of base station 105-*a*. For example, base station 105-*a* may trigger UE 115-*a* to operate according to a particular feedback configuration based on higher layer signaling, such as RRC signaling or MAC CE signaling. In other cases, UE 115-*a* select a particular feedback configuration (e.g., absolute or differential phase feedback) and may transmit an indication of the selected (e.g., enabled) feedback configuration to base station 105-*a*.

In one example, UE 115-*a* may split up the total set of reporting sub-bands for a BWP into a number of groups based on a sub-band group number, N. In other examples, UE 115-*a* may group the sub-bands based on a sub-band group size. UE 115-*a* may determine whether to report reference or differential phase feedback for a particular sub-band of the total set based on where in a sub-band group the particular sub-band is located (e.g., based on an order of sub-band indices for a particular sub-band group). For example, UE 115-*a* may report absolute phase feedback for a first sub-band of a sub-band group and may report differential phase feedback corresponding to offsets relative to the absolute phase value—or another reference phase value—for the other sub-bands of the sub-band group.

A sub-band group number N may be configured at UE 115-*a* by a base station 105 (e.g., base station 105-*a*) or may be autonomously determined and reported to base station 105-*a* by UE 115-*a*. For example, UE 115-*a* may calculate phase values (e.g., actual phase values) for a set of RBs corresponding to a frequency region (e.g., the BWP) and may calculate differences between the phase values. UE 115-*a* may select a number of sub-band groups, N, based on the differences in the phase values and a phase difference threshold. For example, if a large number of contiguous RBs have phase values that are within a certain phase range (e.g., corresponding to the phase difference threshold), the UE 115-*a* may select a relatively small number of sub-band groups, resulting in lower feedback overhead but also less precision in feedback phase values. In some cases, a sub-band size may be based on the sub-band group number N and a size of the BWP in units of reporting sub-bands. For example, if N=3 and the BWP contains 18 reporting sub-bands, then each sub-band group may contain six (6) sub-bands. In some cases (e.g., if UE 115-*a* is configured to report differential phase feedback), UE 115-*a* may report the sub-band group number, N, to base station 105-*a*. UE 115-*a* may transmit the sub-band group number indicator along with a channel quality indicator (CQI), a rank indicator (RI), or both. Table 1 shows an example of reporting the sub-band group number using 2 bits:

TABLE 1

Sub-Band Group Number Reporting

| Bit number | 00 | 01 | 10 | 11 |
|---|---|---|---|---|
| Sub-band group number | 1 | 3 | 6 | 9 |
| Sub-band group size | BWP size | BWP size/3 | BWP size/6 | BWP size/9 |

The sub-band group number may represent a divisor by which to divide the BWP size. If the 2 sub-band group bits are set to '00', the sub-band group number may be equal to 1 and the sub-band group size may encompass all sub-bands of the BWP. If the 2 sub-band group bits are set to '01', the sub-band group number may be equal to 3 and each sub-band group may include a third of the sub-bands of the BWP. If the 2 sub-band group bits are set to '10', the sub-band group number may be equal to 6 and each sub-band group may include a sixth of the sub-bands of the BWP. If the 2 sub-band group bits are set to '11', the sub-band group number may be equal to 9 and may include a ninth of the sub-bands of the BWP. It should be noted that any number of sub-band group bits may be used and that any integer or rational number may be associated with a particular sub-band group bit number without deviating from the scope of the present disclosure. Further, the sub-bands groups may not all contain a same number of sub-bands. For example, if the BWP spans 16 sub-bands, and the sub-band group number is 3, five (5) sub-band groups may include 3 sub-bands and 1 sub-band group may include 1 sub-band. Alternatively, in some cases, 4 sub-band groups may include 3 sub-bands and 2 sub-band groups may include 2 sub-bands. Processes for identifying the number of sub-bands in each group based on a number of sub-band groups and the size of the BWP may be configured at both UE 115-*a* and base station 105-*a*.

Additionally or alternatively, the CSI feedback 210 may include one or more bits (e.g., 1 bit) to indicate if UE 115-*a* is using an increased phase feedback granularity in the frequency domain. If UE 115-*a* is using a granularity finer than a standard (e.g., pre-configured) granularity, the bit may be set to '1,' which may indicate that the CSI feedback 210 contains absolute or differential phase feedback for each half-sub-band (e.g., each half-sub-band of a standard sub-band), or that UE 115-*a* is using doubled frequency feedback granularity. In some cases, a base station 105 (e.g., base station 105-*a*) may configure UE 115-*a* to use double phase frequency feedback granularity, such that phase feedback is reported for sub-bands that are half the size of the sub-bands used for reporting other types of feedback (e.g., amplitude feedback).

The CSI feedback 210 for each sub-band group may include 3 bits per beam indicating an absolute phase value for one sub-band in the group. Additionally, the CSI feedback may include 1 bit per beam indicating a differential phase value for each other sub-band in the group. In one specific example, if the differential phase bit has a value of 0 for a second sub-band of the sub-band group, the beam combining coefficient $c_{r,l,i}$ for the second sub-band may be equal to a reference phase value (e.g., the absolute phase value) plus a delta value. If the differential phase bit has a value of 1 for the second sub-band of the sub-band group, the beam combining coefficient $c_{r,l,i}$ may be equal to the reference phase value (e.g., the absolute phase value) minus the delta value.

The delta value may have a number of possible phase values $$\left(\text{e.g.,}\ \frac{\pi}{4},\frac{\pi}{8},\frac{\pi}{16},\frac{\pi}{32}\right)$$

and may be reported by UE 115-*a*. In some cases, the delta value may be reported along with CQI and/or RI for wideband implementation (e.g., using 2 bits). In wideband implementation, UE 115-*a* may report a single delta value for all sub-band groups (e.g., just 2 bits may be reported to indicate a common delta value). In other implementations, UE 115-*a* may report a delta value for each sub-band group (e.g., 2 bits multiplied by the number of sub-band groups to be reported) for increased precision, but also increased overhead. Table 2 shows an example of reporting delta using 2 bits:

TABLE 2

| Delta Reporting | | | | |
|---|---|---|---|---|
| Bit number | 00 | 01 | 10 | 11 |
| Delta | $\frac{\pi}{4}$ | $\frac{\pi}{8}$ | $\frac{\pi}{16}$ | $\frac{\pi}{32}$ |

If the delta bits (i.e., a delta bit field) are set to '00', delta may be equal to $$\frac{\pi}{4}.$$

If the delta bits are set to '01', delta may be equal to $$\frac{\pi}{8}.$$

If delta bits are set to '10', delta may equal be to $$\frac{\pi}{16}.$$

If the delta bits are set to '11', delta may be equal to $$\frac{\pi}{32}.$$

It should be noted that any number of bits may be used and that any rational or irrational number may be associated with a particular delta bit without deviating from the scope of the present disclosure.

Utilizing absolute and differential phase feedback may decrease the overhead associated with transmitting the CSI feedback 210, supporting bit saving for UE phase feedback. For example, depending on the BWP and the number of sub-band groups, implementing differential phase feedback may reduce the CSI feedback 210 payload overhead by approximately forty (40) percent. Additionally or alternatively, utilizing absolute and differential phase feedback may limit an increase in the payload size of the CSI feedback 210 when switching to a finer sub-band granularity. As such, utilizing absolute and differential phase feedback may enable using a granularity below a configured standard granularity without exceeding a maximum feedback payload threshold.

Figure 3:
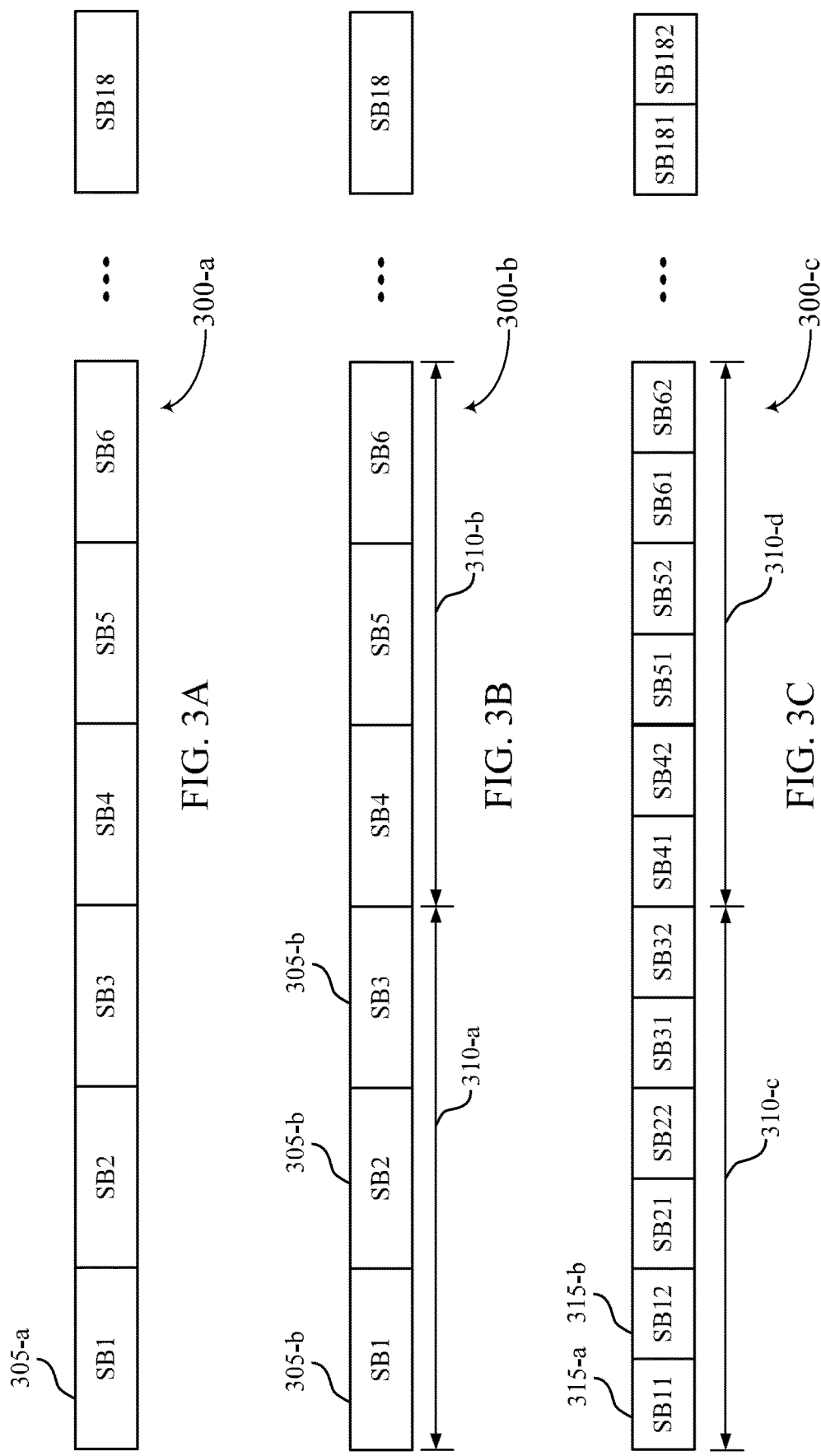
FIGS. 3A, 3B, and 3C illustrate examples of sub-band grouping schemes that support codebook design with differential phase feedback in a frequency domain in accordance with aspects of the present disclosure.

FIG. 3A illustrates an example of a sub-band grouping scheme 300-*a* that supports codebook design with differential phase feedback in a frequency domain in accordance with aspects of the present disclosure. In some examples, sub-band grouping scheme 300-*a* may implement aspects of wireless communications systems 100 and 200. For example, a base station 105 and/or a UE 115 as described with reference to FIGS. 1 and 2 may utilize sub-band grouping scheme 300-*a*. Sub-band grouping scheme 300-*a* may include sub-bands 305-*a* and may represent a span of sub-bands 305-*a* (e.g., 18 sub-bands) over a BWP.

A UE 115 may perform measurements on CSI reference signals received from a base station 105. The UE 115 may determine values of a beam combining coefficient where each value may correspond to a phase of a sub-band 305-*a*. The UE 115 may indicate the phase by providing 2 bits of feedback (e.g., if using QPSK) or 3 bits of feedback (e.g., if using 8PSK) for each sub-band 305-*a* (e.g., 2 bits for SB1, 2 bits for SB2, 2 bits for SB3 . . . ). Each indicated phase may point to an absolute phase value. Additionally or alternatively, the UE 115 may provide amplitude feedback (e.g., sub-band beam amplitude scaling factors) for the sub-bands 305-*a* in a feedback payload.

FIG. 3B illustrates an example of a sub-band grouping scheme 300-*b* that supports codebook design with differential phase feedback in a frequency domain in accordance with aspects of the present disclosure. In some examples, sub-band grouping scheme 300-*b* may implement aspects of wireless communications systems 100 and 200. For example, a base station 105 and/or a UE 115 as described with reference to FIGS. 1 and 2 may utilize sub-band grouping scheme 300-*b*. Sub-band grouping scheme 300-*b* may include sub-bands 305-*b* and may represent a span of sub-bands 305-*b* (e.g., 18 sub-bands) over a BWP.

A UE 115 may determine the size of sub-band groups 310 based on the BWP size and a sub-band group number. For example, in the present example, the BWP containing sub-bands 305-*b* may span 18 sub-bands 305-*b* and the sub-band group number may be 6. As such, each sub-band group 310 may contain 3 sub-bands 305-*b* (e.g., sub-band group 310-*a* contain SB1, SB2, and SB3 and sub-band group 310-*b* may contain SB4, SB5, and SB6).

The UE 115 may perform measurements on CSI reference signals received from a base station 105. The UE 115 may determine values of a beam combining coefficient based on the measurements, where each value may correspond to a phase of a sub-band 305-*b*. The UE 115 may indicate the phase differently depending on where a sub-band 305-*b* is located within its respective sub-band group 310. For example, the UE 115 may indicate an absolute phase value for a first sub-band 305-*b* of a sub-band group 310 (e.g., SB1 of sub-band group 310-*a* and SB4 of sub-band group 310-*b*) and may indicate differential phase values for the other sub-bands 305-*b* in each sub-band group 310 (e.g., SB2 and SB3 of sub-band group 310-*a* and SB5 and SB6 of sub-band group 310-*b*). Alternatively, the UE 115 may indicate an absolute phase value for a last sub-band 305-*b* of a sub-band group 310 (e.g., SB3 of sub-band group 310-*a* and SB6 of sub-band group 310-*b*). Alternatively, the UE 115 may indicate an absolute phase value for a middle sub-band 305-*b* of a sub-band group (e.g., SB2 of sub-band group 310-*a* and SB5 of sub-band group 310-*b*). A sub-band 305-*b*, in the present example, may be a middle sub-band 305-*b* if there are an odd number of sub-bands 305-*b* in the sub-band group 310 and if equal number of sub-bands 305-*b* are between the sub-band 305-*b* and each edge of the sub-band group 310. A description of a middle sub-band where there are even numbers of sub-bands in a sub-band group may be described with reference to FIG. 3C. In some cases, the absolute phase value of each sub-band group 310 may be indicated with 3 bits and the differential phase values may each be indicated with 1 bit. Additionally, the UE 115 may indicate a delta value using 2 bits, where the differential phase values for the sub-bands may be based on a reference phase value, the indicated differential value, and the delta value.

In a first specific example, the UE 115 may indicate an absolute phase value of $e^{j\pi}$ for SB1 using 3 bits. The UE 115 may additionally indicate a wideband delta value of $\pi/8$ for the BWP. The UE 115 may define differential phase values for SB2 and SB3 using a single bit to indicate how to combine the delta value with a reference value. For example, a 0 bit value may indicate to add the delta value to the reference and a 1 bit value may indicate to subtract the delta value from the reference. The UE 115 may generate a 0 bit for SB2 and a 1 bit for SB3 to indicate the differential phase values for these sub-bands 305-b. In a first case, each sub-band group 310 may use the absolute phase value for the first sub-band 305-b in the group as the reference value. In this case, the phase value for SB2 may equal $e^{j\pi}+\pi/8$ and the phase value for SB3 may equal $e^{j\pi}-\pi/8$ based on using the absolute phase value as the reference. In a second case, the reference phase value may vary within a sub-band group 310. For example, the reference phase value for a sub-band 305-b may be the phase value for the preceding sub-band 305-b in the group. In such an example, the phase value for SB2 may equal $e^{j\pi}+\pi/8$ based on using the phase value of SB1 as a reference, and the phase value for SB3 may equal $e^{j\pi}+\pi/8-\pi/8=e^{j\pi}$ based on using the phase value of SB2 as a reference. Other configurations for determining reference values for differential phase feedback may be implemented by UEs 115 and base stations 105.

In another example, the UE 115 may indicate an absolute phase value of $e^{j\pi}$ for SB3 using 3 bits. The UE 115 may additionally indicate a wideband delta value of $\pi/8$ for the BWP. The UE 115 may define differential phase values for SB1 and SB2 using a single bit to indicate how to combine the delta value with a reference value. For example, a 0 bit value may indicate to add the delta value to the reference and a 1 bit value may indicate to subtract the delta value from the reference. The UE 115 may generate a 0 bit for SB1 and a 1 bit for SB2 to indicate the differential phase values for these sub-bands 305-b. In a first case, each sub-band group 310 may use the absolute phase value for SB3 as the reference value. In this case, the phase value for SB1 may equal $e^{j\pi}+\pi/8$ and the phase value for SB2 may equal $e^{j\pi}-\pi/8$ based on using the absolute phase value as the reference. In a second case, the reference phase value may vary within a sub-band group 310. For example, the reference phase value for a sub-band 305-b may be the phase value for the subsequent sub-band 305-b in the group. In such an example, the phase value for SB2 may equal $e^{j\pi}-\pi/8$ based on using the phase value of SB3 as a reference, and the phase value for SB1 may equal $e^{j\pi}+\pi/8-\pi/8=e^{j\pi}$ based on using the phase value of SB2 as a reference.

In yet another example, the UE 115 may indicate an absolute phase value of $e^{j\pi}$ for SB2 using 3 bits. The UE 115 may additionally indicate a wideband delta value of $\pi/8$ for the BWP. The UE 115 may define differential phase values for SB1 and SB3 using a single bit to indicate how to combine the delta value with a reference value. For example, a 0 bit value may indicate to add the delta value to the reference and a 1 bit value may indicate to subtract the delta value from the reference. The UE 115 may generate a 0 bit for SB1 and a 1 bit for SB3 to indicate the differential phase values for these sub-bands 305-b. In a first case, each sub-band group 310 may use the absolute phase value for SB3 as the reference value. In this case, the phase value for SB1 may equal $e^{j\pi}+\pi/8$ and the phase value for SB3 may equal $e^{j\pi}-\pi/8$ based on using the absolute phase value as the reference. In a second case, the reference phase value may vary within a sub-band group 310. For example, the reference phase value for a sub-band 305-b may be the phase value for an immediately preceding sub-band 305-b if subsequent to SB2 and may be the phase value for immediately subsequent sub-band 305-b in the group if preceding SB2.

FIG. 3C illustrates an example of a sub-band grouping scheme 300-c that supports codebook design with differential phase feedback in a frequency domain in accordance with aspects of the present disclosure. In some examples, sub-band grouping scheme 300-c may implement aspects of wireless communications systems 100 and 200. For example, a base station 105 and/or a UE 115 as described with reference to FIGS. 1 and 2 may utilize sub-band grouping scheme 300-c. Sub-band grouping scheme 300-c may include sub-bands 315 and may represent a span of sub-bands 315 (e.g., 36 sub-bands) over a BWP. A sub-band 315 may span half the frequency resources of a sub-band 305. In some cases (e.g., if increased phase feedback granularity is enabled), a sub-band 315 may correspond to a sub-band for phase feedback while a sub-band 305 may correspond to a sub-band for amplitude feedback.

A UE 115 may determine the size of sub-band groups 310 based on a BWP that sub-bands 315 span and a sub-band group number. For example, in the present example, the BWP containing sub-bands 315 may span 36 sub-bands 315 and the sub-band group number may be 6. As such, each sub-band group 310 may contain 6 sub-bands (e.g., sub-band group 310-c may contain SB11, SB12, SB21, SB22, SB31 and SB32 and sub-band group 310-d may contain SB41, SB42, SB51, SB52, SB61, and SB62). In some cases, the UE 115 may be configured to determine a maximum of 18 sub-bands according to a standard granularity, but may instead determine 36 sub-bands based on utilizing a new increased granularity (e.g., a frequency feedback granularity that is double the amplitude feedback granularity).

The UE 115 may perform measurements on CSI reference signals received from a base station 105. The UE 115 may determine values of a beam combining coefficient based on the measurements, where each value may correspond to a phase of a sub-band 315. The UE 115 may indicate the phase differently depending on where a sub-band 315 is located within its respective sub-band group 310. In one example, the UE 115 may indicate an absolute phase value for a first sub-band 315 of a sub-band group 310 (e.g., SB11 of sub-band group 310-c and SB41 of sub-band group 310-d) and may indicate differential phase values for the other sub-bands 315 in the sub-band groups 310 (e.g., SB12, SB21, SB22, SB31, and SB32 of sub-band group 310-c and SB42, SB51, SB52, SB61, and SB62 of sub-band group 310-d). In another example, the UE 115 may indicate an absolute phase value for a last sub-band 315 of a sub-band group 310 (e.g., SB32 of sub-band group 310-c and SB62 of sub-band group 310-d). In yet another example, the UE 115 may indicate an absolute phase value for a middle sub-band 315 of a sub-band group (e.g., SB21 or SB22 of sub-band group 310-c and SB51 or SB52 of sub-band group 310-d). A sub-band 315, in the present example, may be a middle sub-band 315 if there are an even number of sub-bands 315 in the sub-band group 310 and if a magnitude of a difference in a number of sub-bands 315 are between the sub-band 315 and each edge of the sub-band group 310 is one. For instance, SB21 may be a middle sub-band 315 because there may be two sub-bands 315 (e.g., SB11 and SB12) before SB21 and three sub-bands 315 after (e.g., SB21, SB31, and SB32). SB22 may also be a middle sub-band because there may be three sub-bands 315 (e.g., SB11, SB12, and SB21) before SB22 and three sub-bands 315 (e.g., SB31 and SB32) after. The absolute phase value of each sub-band group 310 may be indicated with 3 bits and the differential phase values may each be indicated with 1 bit. The UE 115 may additionally indicate a delta value (e.g., which may be referred to as a differential phase value) using a number of bits (e.g., 2).

In some cases, a single sub-band amplitude scaling factor $p_{r,l,i}^{(SB)}$ may apply to multiple sub-bands 315. For instance, with regards to FIG. 3, each sub-band amplitude scaling factor $p_{r,l,i}^{(SB)}$ may be associated with two sub-bands 315 (e.g., sub-bands 315-$a$ and (SB) 315-$b$) or a single sub-band 305. In general, a sub-band amplitude factor $p_{r,l,i}^{(SB)}$ may be associated with a specific configured frequency granularity.

Figure 4:
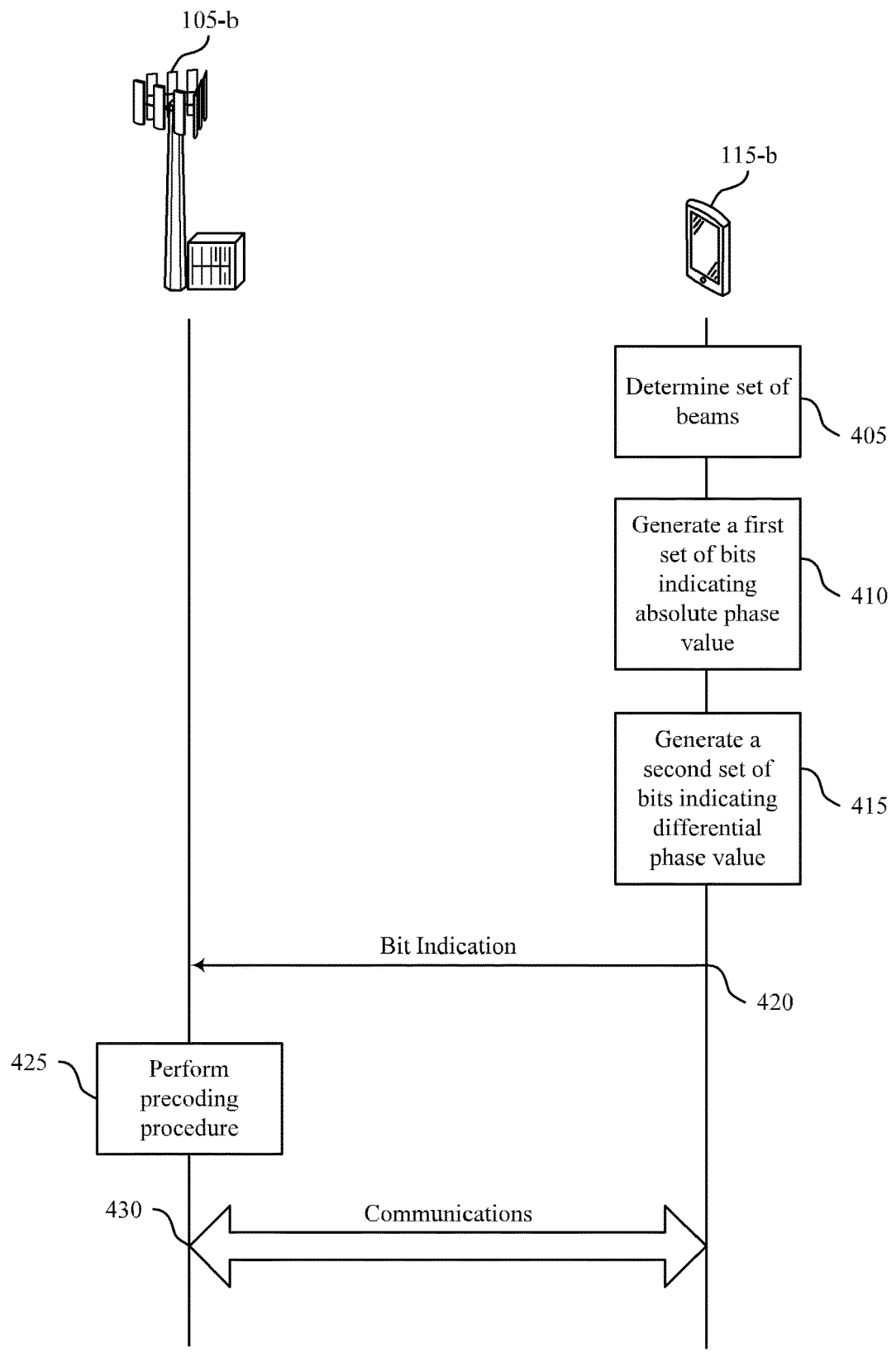
FIG. 4 illustrates an example of a process flow that supports codebook design with differential phase feedback in a frequency domain in accordance with aspects of the present disclosure.

FIG. 4 illustrates an example of a process flow 400 that supports codebook design with differential phase feedback in a frequency domain in accordance with aspects of the present disclosure. In some examples, process flow 400 may implement aspects of a wireless communications system 100 or 200. For example, a base station 105 and UE 115, such as base station 105-$b$ and UE 115-$b$, may perform one or more of the processes described with reference to process flow 400. These processes may be performed according to one or more of the sub-band grouping schemes described with reference to FIGS. 3A, 3B, and 3C. Alternative examples of the following may be implemented, where some steps are performed in a different order than described or are not performed at all. In some cases, steps may include additional features not mentioned below, or further steps may be added.

At 405, UE 115-$b$ may determine a set of beams for reporting feedback according to a beam combination codebook for precoding by base station 105-$b$. The beam combination codebook may be an example of a Type II codebook, such as an NR Type II codebook. The feedback may include absolute phase values, differential phase values, or both. UE 115-$b$ may determine the set of beams using a communications manager 515, a beam determiner 620, a beam determiner 710, or a communications manager 810 as described herein.

At 410, UE 115-$b$ may generate, for a beam of the set of beams, a first set of bits indicating an absolute phase value for a first sub-band of a sub-band group, where the sub-band group includes the first sub-band and one or more additional sub-bands. In some cases, UE 115-$b$ may generate, for the beam of the set of beams, one or more additional first bits indicating additional absolute phase values for first sub-bands of one or more additional sub-band groups (e.g., the remaining sub-band groups in a BWP). UE 115-$b$ may additionally generate absolute phase value bits for the other beams in the set of beams. UE 115-$b$ may generate the first set of bits using a communications manager 515, an absolute phase value bit generator 625, an absolute value bit generator 715, or a communications manager 810 as described herein.

At 415, UE 115-$b$ may generate, for the beam, a second set of bits indicating differential phase values for the one or more additional sub-bands of the sub-band group. The second set of bits may include one bit indicating whether to add (e.g., increase) or subtract (e.g., decrease) a differential phase value from a reference phase value to determine a phase-value for each sub-band of the additional sub-bands. The differential phase value may be indicated by a third set of bits corresponding to a delta value (e.g., a set of bits as defined in Table 2). In some cases, the reference phase value may be an absolute phase value for the first-sub band of the sub-band group or any other sub-band (e.g., a previous sub-band) in the sub-band group according to an order of sub-band indices for the sub-band group. UE 115-$b$ may generate, for the beam, one or more additional second bits indicating additional differential phase values for additional sub-bands of the one or more additional sub-band groups (e.g., the remaining sub-band groups in the BWP). UE 115-$b$ may additionally generate differential phase value bits for the other beams in the set of beams. UE 115-$b$ may generate the first set of bits using a communications manager 515, a differential phase value bit generator 630, an absolute value bit generator 720, or a communications manager 810 as described herein.

At 420, UE 115-$b$ may transmit, to base station 105-$b$, an indication of the first set of bits and the second set of bits. The indication may, for example, be included in a CSI feedback message. Base station 105-$b$ may receive, from UE 115-$b$, the indication. In some cases, UE 115-$b$ may transmit an indication (e.g., an indication as described with regards to Table 1) of a number of sub-band groups in the set of sub-band groups (e.g., contained in the BWP). UE 115-$b$ may transmit the indication using a communications manager 515, a bit indication transmitter 635, a bit indication transmitter 725, or a communications manager 810 as described herein.

At 425, base station 105-$b$ may perform a precoding procedure for the set of beams using at least the first set of bits, the second set of bits, and a beam combination codebook. For example, base station 105-$b$ may perform the precoding procedure using bits indicating phase values for each sub-band of each beam of the set of beams. Performing the precoding procedure may enable base station 105-$b$ to more accurately transmit or receive transmissions. Base station 105-$b$ may perform the precoding procedure using communications manager 915, precoding procedure performer 1025, precoding procedure performer 1115, or communications manager 1210.

At 430, base station 105-$b$ and UE 115-$b$ may communicate according to the precoding procedure. Such communications may, for instance, involve exchanging control information or data. By communicating according to base station 105-$b$ performing the precoding procedure, UE 115-$b$ may more accurately receive transmissions from or transmit transmissions to base station 105-$b$. To perform communications, base station 105-$b$ and UE 115-$b$ may use respective antenna arrays.

Figure 5:
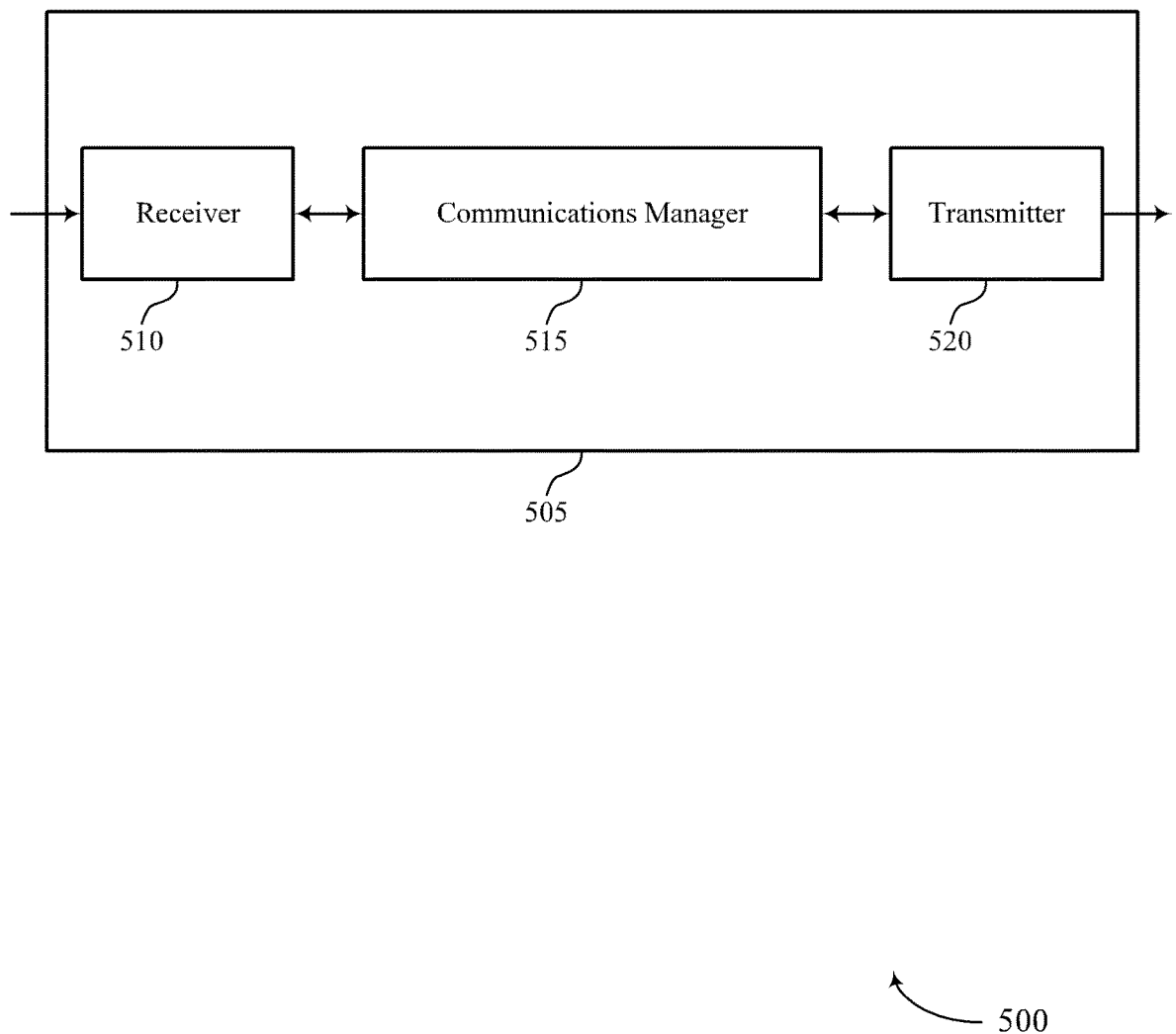
FIGS. 5 and 6 show block diagrams of devices that support codebook design with differential phase feedback in a frequency domain in accordance with aspects of the present disclosure.

FIG. 5 shows a block diagram 500 of a device 505 that supports codebook design with differential phase feedback in a frequency domain in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to differential phase feedback in the frequency domain for a beam combination codebook, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine a set of beams for reporting feedback according to a beam combination codebook (e.g., an NR Type II codebook) for precoding by a base station, generate, for a beam of the set of beams, a first set of bits indicating an absolute phase value for a first sub-band of a sub-band group, where the sub-band group includes the first sub-band and one or more additional sub-bands, generate a second set of bits indicating differential phase values for the one or more additional sub-bands of the sub-band group, and transmit, to the base station, an indication of the first set of bits and the second set of bits. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
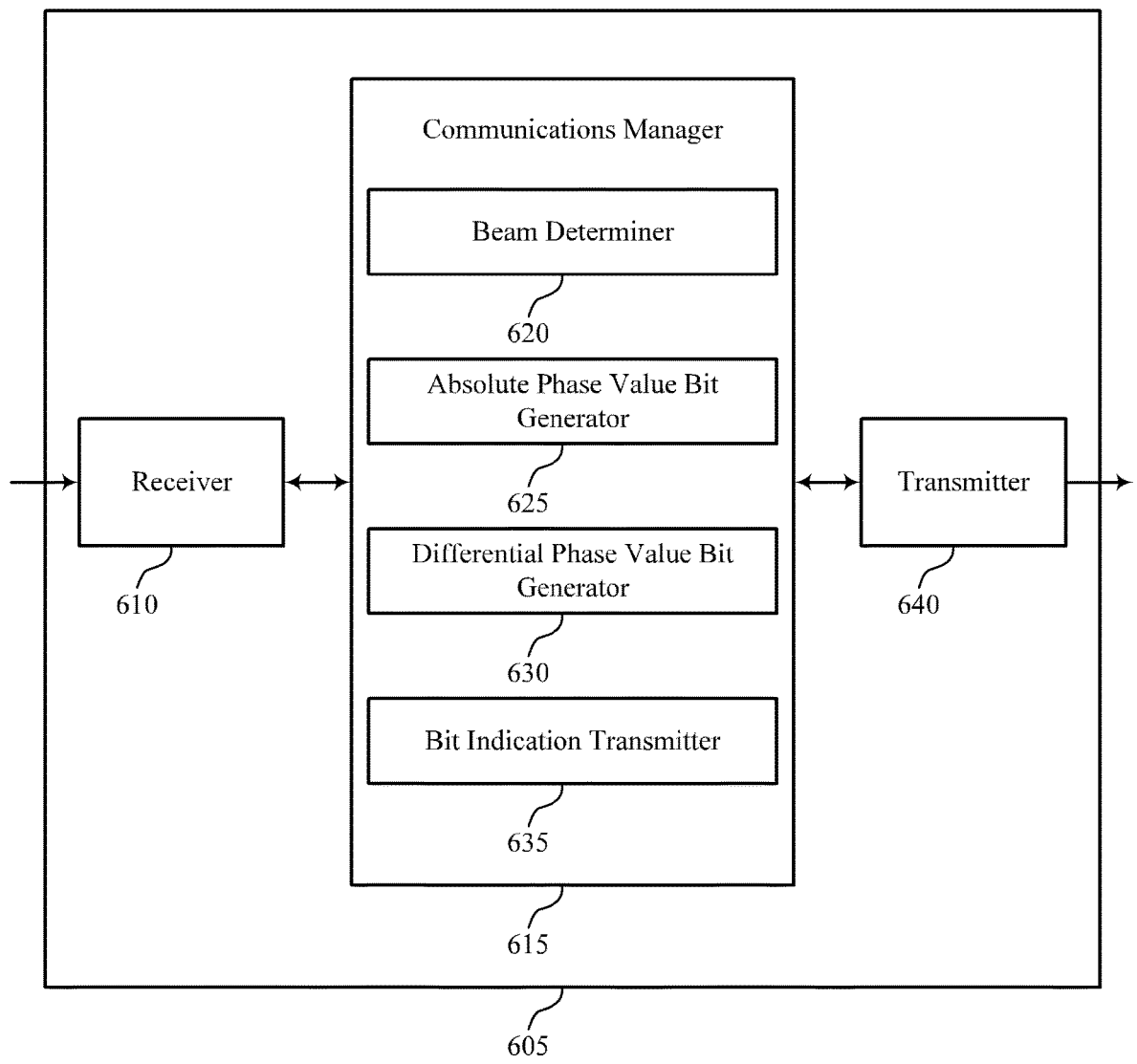

FIG. 6 shows a block diagram 600 of a device 605 that supports codebook design with differential phase feedback in a frequency domain in accordance with aspects of the present disclosure. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to codebook design with differential phase feedback in a frequency domain, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a beam determiner 620, an absolute phase value bit generator 625, a differential phase value bit generator 630, and a bit indication transmitter 635. The communications manager 615 may be an example of aspects of the communications manager 810 described herein.

The beam determiner 620 may determine a set of beams for reporting feedback according to a beam combination codebook for precoding by a base station.

The absolute phase value bit generator 625 may generate, for a beam of the set of beams, a first set of bits indicating an absolute phase value for a first sub-band of a sub-band group, where the sub-band group includes the first sub-band and one or more additional sub-bands. The differential phase value bit generator 630 may generate a second set of bits indicating differential phase values for the one or more additional sub-bands of the sub-band group.

The bit indication transmitter 635 may transmit, to the base station, an indication of the first set of bits and the second set of bits. For example, the indication of the first set of bits and the second set of bits may be an encoded feedback message including encoded bits that represent the first set of bits and the second set of bits.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas. In some cases, the bit indication transmitter 635 may be a component of the transmitter 640.

Figure 7:
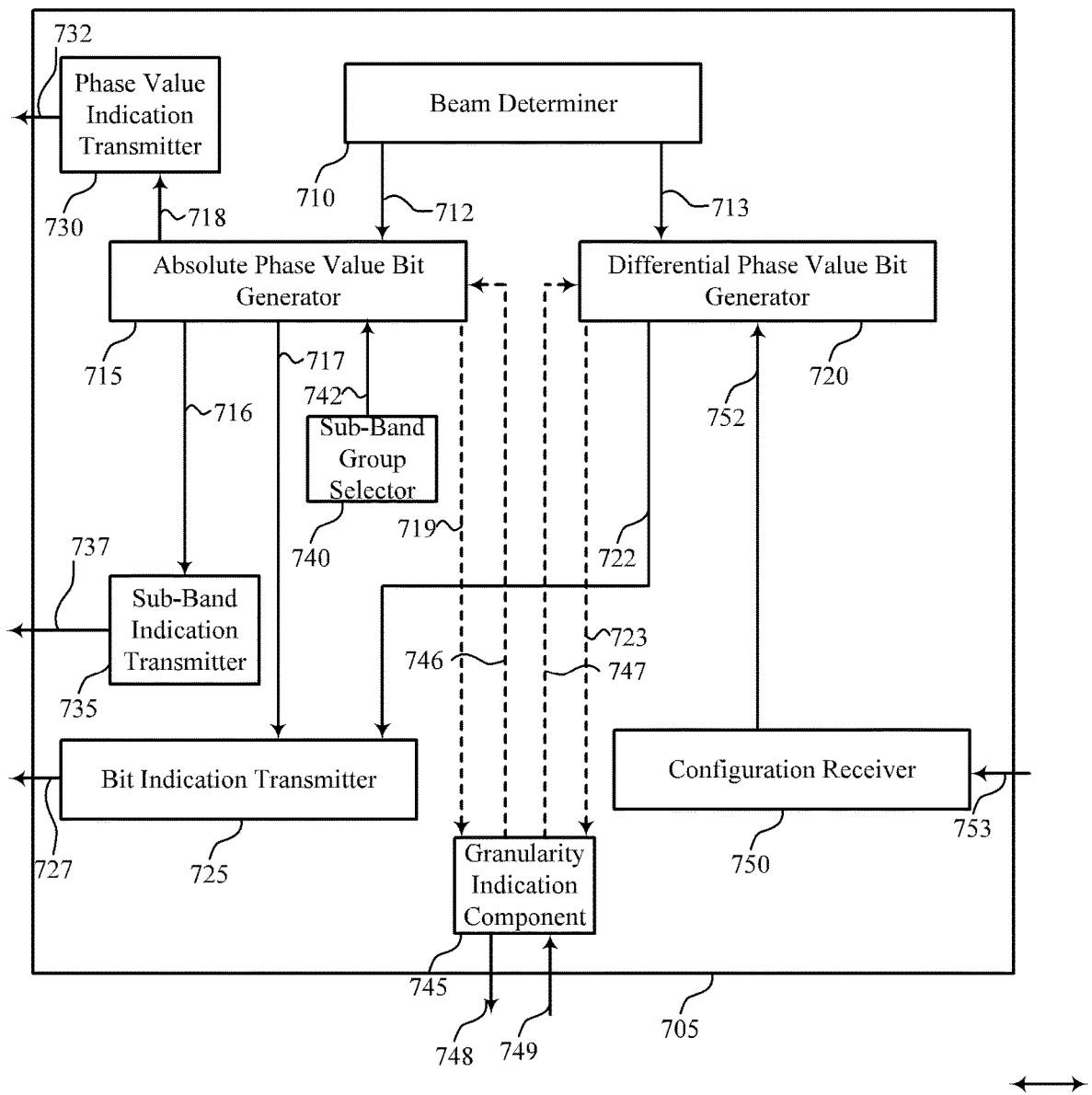
FIG. 7 shows a block diagram of a communications manager that supports codebook design with differential phase feedback in a frequency domain in accordance with aspects of the present disclosure.

FIG. 7 shows a block diagram 700 of a communications manager 705 that supports codebook design with differential phase feedback in a frequency domain in accordance with aspects of the present disclosure. The communications manager 705 may be an example of aspects of a communications manager 515, a communications manager 615, or a communications manager 810 described herein. The communications manager 705 may include a beam determiner 710, an absolute phase value bit generator 715, a differential phase value bit generator 720, a bit indication transmitter 725, a phase value indication transmitter 730, a sub-band indication transmitter 735, a sub-band group selector 740, a granularity indication component 745, and a configuration receiver 750. Each of these modules may communicate, directly or indirectly, with one another (e.g., via one or more buses).

The beam determiner 710 may determine a set of beams for reporting feedback according to a beam combination codebook for precoding by a base station. For example, the beam combination codebook may be an example of an NR Type II codebook. In some examples, the beam determiner 710 may send an indication 712 of the determined set of beams to the absolute phase value bit generator 715 and/or an indication 713 of the determined set of beams to the differential phase value bit generator 720.

The absolute phase value bit generator 715 may generate, for a beam of the set of beams, a first set of bits indicating an absolute phase value for a first sub-band of a sub-band group, where the sub-band group includes the first sub-band and one or more additional sub-bands. In some examples, the absolute phase value bit generator 715 may generate one or more additional first sets of bits indicating additional absolute phase values for first sub-bands of one or more additional sub-band groups of a set of sub-band groups. In some cases, a number of sub-band groups in the set of sub-band groups is configured by the base station.

In some cases, absolute phase value bit generator 715 may receive an indication 712 of the set of beams from beam determiner 710. Absolute phase value bit generator 715 may send an indication 717 of the first set of bits to bit indication transmitter 725. Absolute phase value bit generator 715 may send an indication 718 of whether the reference phase is the absolute value for the first sub-band or a phase value for a preceding sub-band in the sub-band group to phase value indication transmitter 730. Absolute phase value bit generator 715 may send an indication 716 of a number of sub-band groups in the set of sub-band groups to sub-band indication transmitter 735. Absolute phase value bit generator 715 may receive an indication 742 of a selection of a number of sub-band groups in the set of sub-band groups from sub-band group selector 740. Absolute phase value bit generator 715 may send an indication 719 of whether a frequency domain granularity for phase feedback is smaller than a frequency domain granularity for amplitude feedback to granularity indication component 745. Absolute phase value bit generator 715 may receive an indication 746 indicating to use a frequency domain granularity for phase feedback that is smaller than a frequency domain granularity for amplitude feedback.

The differential phase value bit generator 720 may generate a second set of bits indicating differential phase values for the one or more additional sub-bands of the sub-band group. In some examples, the differential phase value bit generator 720 may generate one or more additional second sets of bits indicating differential phase values for additional sub-bands of the one or more additional sub-band groups of the set of sub-band groups. In some cases, the second set of bits includes, for each sub-band of the one or more additional sub-bands, one bit indicating whether to increase or decrease a reference phase value by a differential phase value to determine a phase value for each sub-band of the one or more additional sub-bands. In some examples, the differential phase value bit generator 720 may generate a third set of bits indicating the differential phase value. In some cases, the reference phase value may be the absolute phase value for the first sub-band. In other cases, the reference phase value for a sub-band may be a phase value for a preceding sub-band or a subsequent sub-band in the sub-band group according to an order of sub-band indices for the sub-band group.

In some cases, for a first subset of the one or more additional sub-bands, the reference phase value includes a phase value for a preceding sub-band in the sub-band group according to an order of sub-band indices for sub-band group and, for a second subset of the one or more additional sub-bands, the reference phase value includes a phase value for a subsequent sub-band in the sub-band group according to the order of the sub-band indices for the sub-band group. In some cases, the first sub-band is a lowest frequency sub-band of the sub-band group or a highest frequency sub-band of the sub-band group. In some cases, the first sub-band is subsequent to a first subset of the one or more additional sub-bands according to an order of sub-band indices for the sub-band group, where a second subset of one or more of the one or more additional sub-bands are subsequent to the first sub-band according to the order of the sub-band indices for sub-band group, and where a difference between a number of sub-bands in the first subset and a number of sub-bands in the second subset is no more than one.

In some cases, differential phase value bit generator 720 may receive an indication 713 of the set of beams from beam determiner 710. Differential phase value bit generator 720 may send an indication 722 of the second set of bits to bit indication transmitter 725. Differential phase value bit generator 720 may send an indication 723 of whether a frequency domain granularity for phase feedback is smaller than a frequency domain granularity for amplitude feedback to granularity indication component 745. Differential phase value bit generator 720 may receive an indication 747 from granularity indication component 745 indicating to use a frequency domain granularity for phase feedback that is smaller than a frequency domain granularity for amplitude feedback. Differential phase value bit generator 720 may receive an indication 752 from configuration receiver 750 of a configuration to implement differential phase feedback.

The bit indication transmitter 725 may transmit, to the base station, an indication 727 of the first set of bits and the second set of bits. In some examples, the bit indication transmitter 725 may transmit, to the base station, an indication of the third set of bits. In some examples, the bit indication transmitter 725 may transmit, to the base station, an indication of the one or more additional first sets of bits and the one or more additional second sets of bits. The bit indication transmitter 725 may receive an indication 717 of the first set of bits from absolute phase value bit generator 715. The bit indication transmitter 725 may receive an indication 722 of the second set of bits from differential phase value bit generator 720.

The phase value indication transmitter 730 may transmit, to the base station, an indication 732 of whether the reference phase value is the absolute phase value for the first sub-band or a phase value for a preceding sub-band in the sub-band group. The phase value indication transmitter 730 may receive an indication 718 of whether the reference phase is the absolute value for the first sub-band or a phase value for a preceding sub-band in the sub-band group from absolute phase value bit generator 715.

The sub-band indication transmitter 735 may transmit, to the base station, an indication 737 of a number of sub-band groups in the set of sub-band groups. In some cases, the indication of the number of sub-band groups includes a bit field indicating either one sub-band group or a plurality of sub-band groups, wherein a sub-band group size relative to a bandwidth part size is based at least in part on a value of the bit field. The sub-band indication transmitter 735 may receive an indication 716 of a number of sub-band groups in the set of sub-band groups from absolute phase value bit generator 715.

The sub-band group selector 740 may calculate a set of phase values for a set of resource blocks corresponding to a frequency region. In some examples, the sub-band group selector 740 may calculate differences in phase values for resource blocks in the set of resource blocks. In some examples, the sub-band group selector 740 may select a number of sub-band groups in the set of sub-band groups based on the calculated differences in the phase values and a phase difference threshold. The sub-band group selector 740 may transmit an indication 742 of a selection of a number of sub-band groups in the set of sub-band groups from absolute phase value bit generator 715.

The granularity indication component 745 may transmit, to the base station, an indication 748 of whether a frequency domain granularity for phase feedback is smaller than a frequency domain granularity for amplitude feedback. The granularity indication component 745 may receive, from the base station, an indication 749 to use a frequency domain granularity for phase feedback that is smaller than a frequency domain granularity for amplitude feedback. Granularity indication component 745 may receive an indication 719 from absolute phase value bit generator 715 indicating whether a frequency domain granularity for phase feedback is smaller than a frequency domain granularity for amplitude feedback. Granularity indication component 745 may receive an indication 723 from differential phase value bit generator 720 indicating whether a frequency domain granularity for phase feedback is smaller than a frequency domain granularity for amplitude feedback. Granularity indication component 745 may send an indication 746 to absolute phase value bit generator 715 indicating to use a frequency domain granularity for phase feedback that is smaller than a frequency domain granularity for amplitude feedback. Granularity indication component 745 may send an indication 747 to differential phase value bit generator 720 indicating to use a frequency domain granularity for phase feedback that is smaller than a frequency domain granularity for amplitude feedback.

The configuration receiver 750 may receive, from the base station, a configuration 753 to implement differential phase feedback, where the generating the second set of bits is based on the configuration to implement differential phase feedback. In some cases, the configuration is received in RRC signaling, MAC CE signaling, or a combination thereof. Configuration receiver 750 may send an indication 752 of a configuration to implement differential phase feedback to differential phase value bit generator 720.

Figure 8:
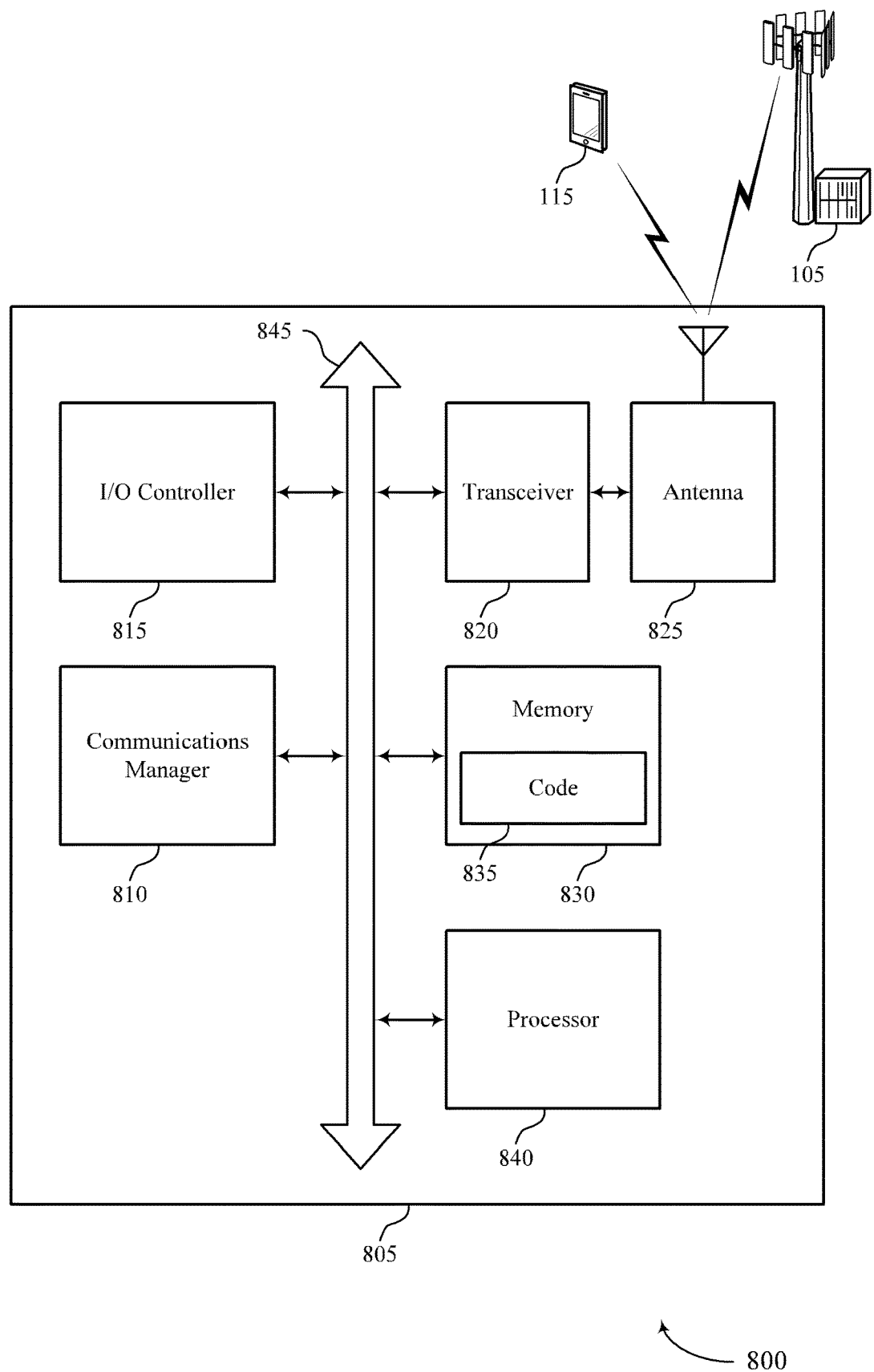
FIG. 8 shows a diagram of a system including a device that supports codebook design with differential phase feedback in a frequency domain in accordance with aspects of the present disclosure.

FIG. 8 shows a diagram of a system 800 including a device 805 that supports codebook design with differential phase feedback in a frequency domain in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine a set of beams for reporting feedback according to a beam combination codebook for precoding by a base station, generate, for a beam of the set of beams, a first set of bits indicating an absolute phase value for a first sub-band of a sub-band group, where the sub-band group includes the first sub-band and one or more additional sub-bands, generate a second set of bits indicating differential phase values for the one or more additional sub-bands of the sub-band group, and transmit, to the base station, an indication of the first set of bits and the second set of bits.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting codebook design with differential phase feedback in a frequency domain).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
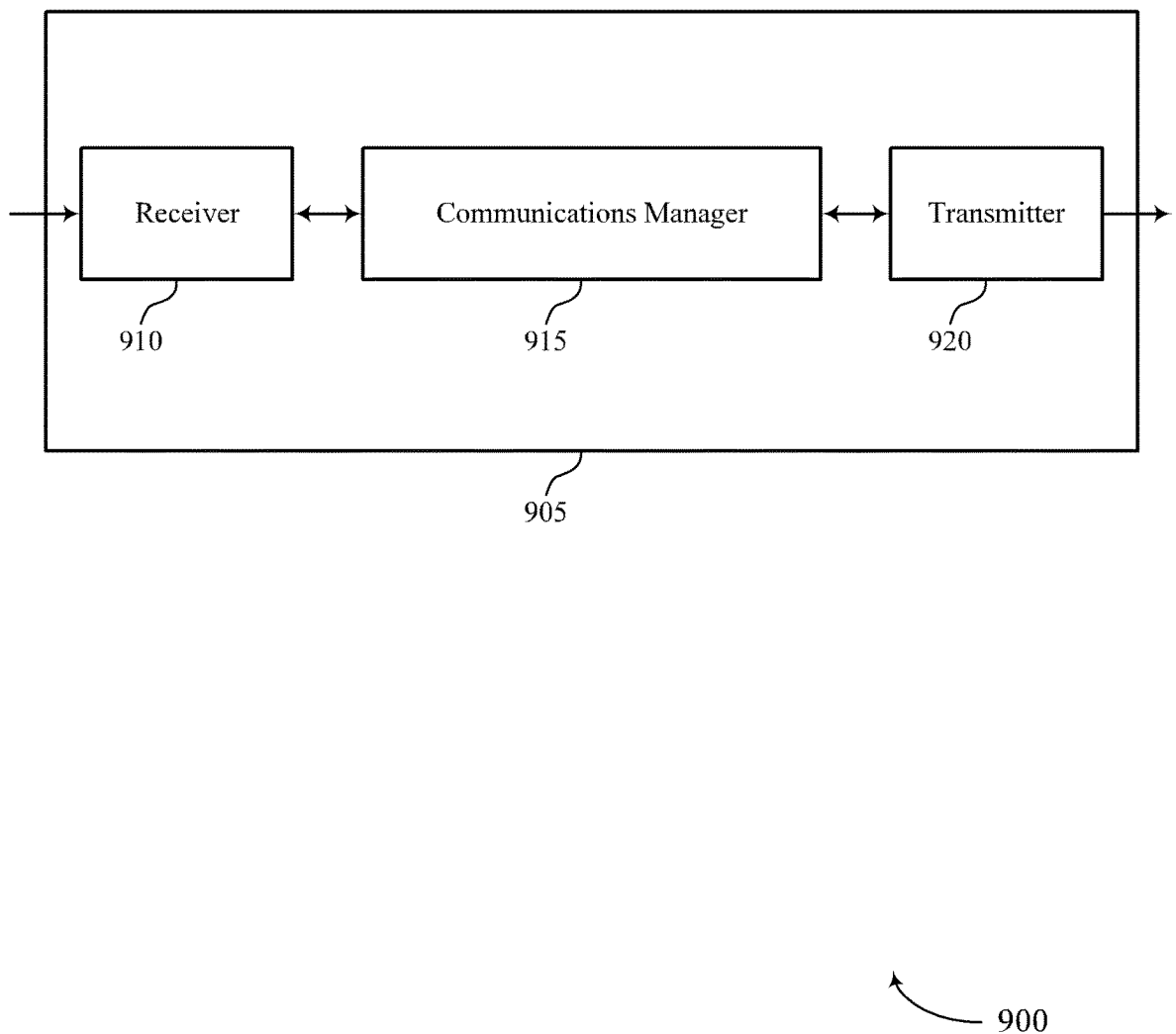
FIGS. 9 and 10 show block diagrams of devices that support codebook design with differential phase feedback in a frequency domain in accordance with aspects of the present disclosure.

FIG. 9 shows a block diagram 900 of a device 905 that supports codebook design with differential phase feedback in a frequency domain in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to differential phase feedback in the frequency domain for a beam combination codebook, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, an indication of a first set of bits and a second set of bits, where the first set of bits indicates, for a beam of a set of beams, an absolute phase value for a first sub-band of a sub-band group and the second set of bits indicates differential phase values for one or more additional sub-bands of the sub-band group, where the sub-band group includes the first sub-band and the one or more additional sub-bands, perform a precoding procedure for the set of beams using at least the first set of bits, the second set of bits, and a beam combination codebook, and communicate with the UE according to the precoding procedure. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
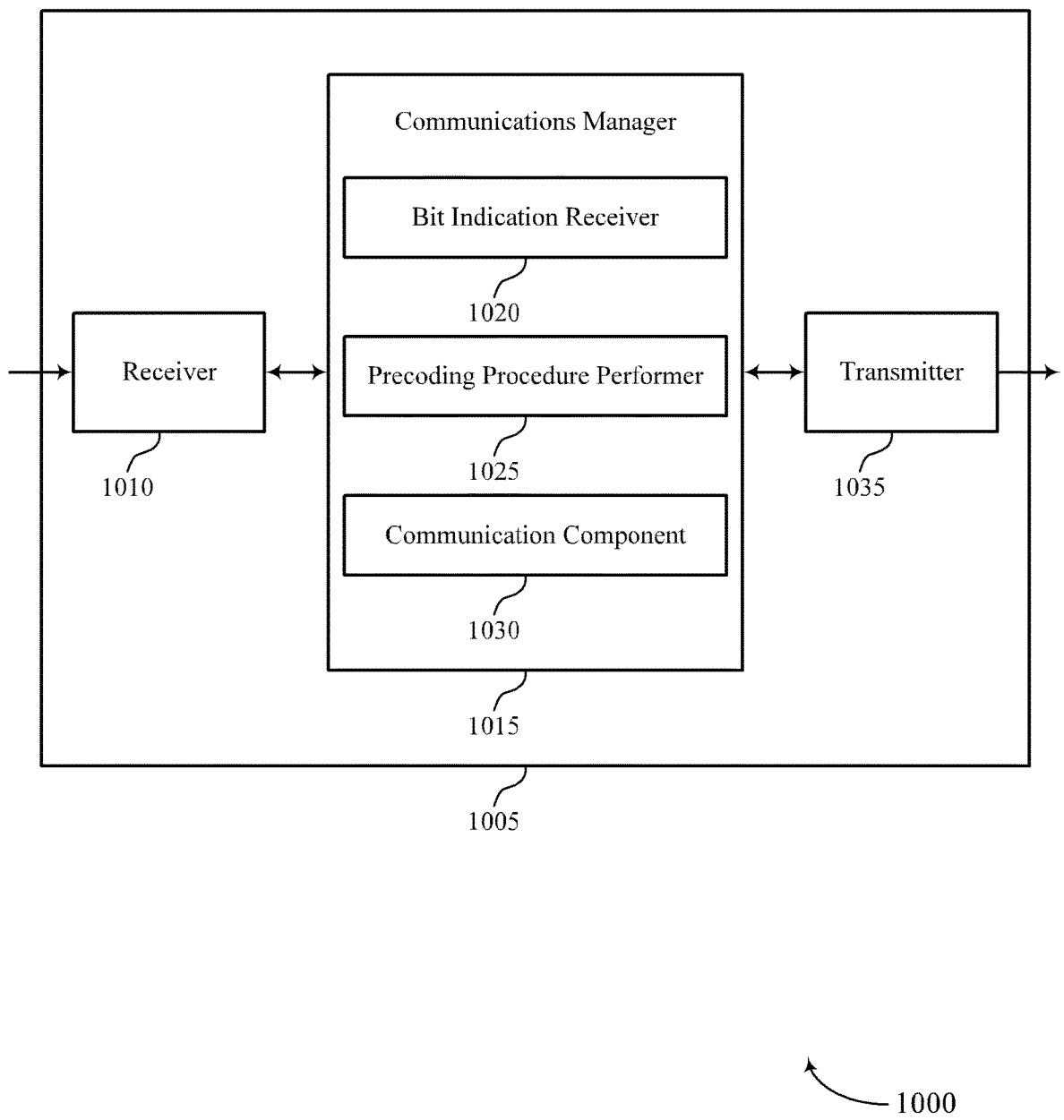

FIG. 10 shows a block diagram 1000 of a device 1005 that supports codebook design with differential phase feedback in a frequency domain in accordance with aspects of the present disclosure. The device 1005 may be an example of aspects of a device 905 or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to codebook design with differential phase feedback in a frequency domain, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a bit indication receiver 1020, a precoding procedure performer 1025, and a communication component 1030. The communications manager 1015 may be an example of aspects of the communications manager 1210 described herein.

The bit indication receiver 1020 may receive, from a UE, an indication of a first set of bits and a second set of bits, where the first set of bits indicates, for a beam of a set of beams, an absolute phase value for a first sub-band of a sub-band group and the second set of bits indicates differential phase values for one or more additional sub-bands of the sub-band group, where the sub-band group includes the first sub-band and the one or more additional sub-bands.

The precoding procedure performer 1025 may perform a precoding procedure for the set of beams using at least the first set of bits, the second set of bits, and a beam combination codebook (e.g., an NR Type II codebook). The communication component 1030 may communicate with the UE according to the precoding procedure.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
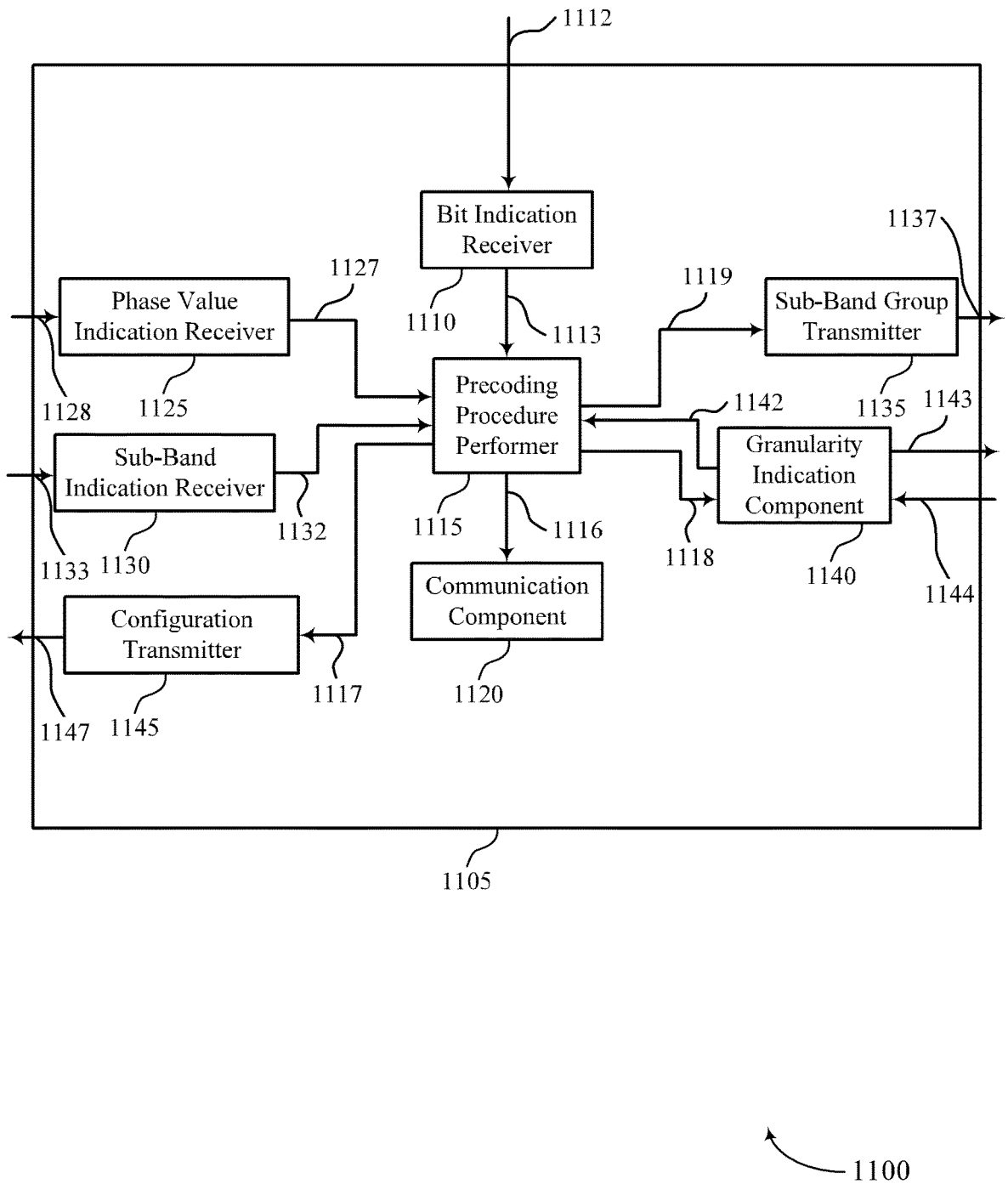
FIG. 11 shows a block diagram of a communications manager that supports codebook design with differential phase feedback in a frequency domain in accordance with aspects of the present disclosure.

FIG. 11 shows a block diagram 1100 of a communications manager 1105 that supports codebook design with differential phase feedback in a frequency domain in accordance with aspects of the present disclosure. The communications manager 1105 may be an example of aspects of a communications manager 915, a communications manager 1015, or a communications manager 1210 described herein. The communications manager 1105 may include a bit indication receiver 1110, a precoding procedure performer 1115, a communication component 1120, a phase value indication receiver 1125, a sub-band indication receiver 1130, a sub-band group transmitter 1135, a granularity indication component 1140, and a configuration transmitter 1145. Each of these modules may communicate, directly or indirectly, with one another (e.g., via one or more buses).

The bit indication receiver 1110 may receive, from a UE, an indication 1112 of a first set of bits and a second set of bits, where the first set of bits indicates, for a beam of a set of beams, an absolute phase value for a first sub-band of a sub-band group and the second set of bits indicates differential phase values for one or more additional sub-bands of the sub-band group, where the sub-band group includes the first sub-band and the one or more additional sub-bands. In some examples, the bit indication receiver 1110 may receive, from the UE, an indication of one or more additional first sets of bits and one or more additional second sets of bits, where the one or more additional first sets of bits indicate additional absolute phase values for first sub-bands of one or more additional sub-band groups of a set of sub-band groups and the one or more additional second sets of bits indicate differential phase values for additional sub-bands of the one or more additional sub-band groups of the set of sub-band groups. In some cases, the second set of bits includes, for each sub-band of the one or more additional sub-bands, one bit indicating whether to increase or decrease a reference phase value by a differential phase value to determine a phase value for each sub-band of the one or more additional sub-bands. In some examples, the bit indication receiver 1110 may receive, from the UE, an indication of a third set of bits indicating the differential phase value, where the precoding procedure is performed based on the differential phase value. In some cases, the reference phase value may be the absolute phase value for the first sub-band. In other cases, the reference phase value for a sub-band may be a phase value for a preceding sub-band in the sub-band group according to an order of sub-band indices for the sub-band group.

In some cases, for a first subset of the one or more additional sub-bands, the reference phase value includes a phase value for a preceding sub-band in the sub-band group according to an order of sub-band indices for sub-band group and, for a second subset of the one or more additional sub-bands, the reference phase value includes a phase value for a subsequent sub-band in the sub-band group according to the order of the sub-band indices for the sub-band group. In some cases, the first sub-band is a lowest frequency sub-band of the sub-band group or a highest frequency sub-band of the sub-band group. In some cases, the first sub-band is subsequent to a first subset of the one or more additional sub-bands according to an order of sub-band indices for the sub-band group, where a second subset of one or more of the one or more additional sub-bands are subsequent to the first sub-band according to the order of the sub-band indices for sub-band group, and where a difference between a number of sub-bands in the first subset and a number of sub-bands in the second subset is no more than one. In some cases, the bit indication receiver 1110 may send an indication 1113 of the first and second set of bits to precoding procedure performer 1115.

The precoding procedure performer 1115 may perform a precoding procedure for the set of beams using at least the first set of bits, the second set of bits, and a beam combination codebook. In some cases, the beam combination codebook may be an example of an NR Type II codebook.

In some cases, precoding procedure performer 1115 may receive an indication 1113 of the first set of bits and the second set of bits from bit indication receiver 1110. Precoding procedure performer 1115 may send an indication 1116 that the precoding procedure has been performed to communication component 1120. Precoding procedure performer 1115 may receive an indication 1127 of whether the reference phase value is the absolute phase value for the first sub-band or a phase value for a preceding sub-band in the sub-band group from phase value indication receiver 1125. Precoding procedure performer 1115 may receive an indication 1132 of a number of sub-band groups in the set of sub-band groups from sub-band indication receiver 1130. Sub-band indicator may transmit a configuration 1117 to implement differential phase feedback to configuration transmitter 1145. Precoding procedure performer 1115 may transmit a configuration 1119 of a number of sub-band groups in the set of sub-band groups to precoding procedure performer 1115. Precoding procedure performer 1115 may receive an indication 1142 of whether a frequency domain granularity for phase feedback is smaller than a frequency domain granularity for amplitude feedback from granularity indication component 1140. Precoding procedure performer 1115 may send an indication 1118 to use a frequency domain granularity for phase feedback that is smaller than a frequency domain granularity to granularity indication component 1140.

The communication component 1120 may communicate with the UE according to the precoding procedure. Communication component 1120 may receive an indication 1116 that the precoding procedure has been performed from precoding procedure performer 1116.

The phase value indication receiver 1125 may receive, from the UE, an indication 1128 of whether the reference phase value is the absolute phase value for the first sub-band or a phase value for a preceding sub-band in the sub-band group. Phase value indication receiver 1125 may send an indication 1127 of whether the reference phase value is the absolute phase value for the first sub-band or a phase value for a preceding sub-band in the sub-band group to precoding procedure performer 1115.

The sub-band indication receiver 1130 may receive, from the UE, an indication 1133 of a number of sub-band groups in the set of sub-band groups. In some cases, the indication of the number of sub-band groups includes a bit field indicating either one sub-band group or one of a set of divisors for a sub-band group size relative to a BWP size. Sub-band indication receiver 1130 may send an indication 1132 of a number of sub-band groups in the set of sub-band groups to precoding procedure performer 1115.

The sub-band group transmitter 1135 may transmit, to the UE 115, a configuration 1137 of a number of sub-band groups in the set of sub-band groups. Sub-band group transmitter 1135 may receive a configuration 1119 of a number of sub-band groups in the set of sub-band groups from precoding procedure performer 1115.

In some cases, the granularity indication component 1140 may receive, from the UE, an indication 1144 of whether a frequency domain granularity for phase feedback is smaller than a frequency domain granularity for amplitude feedback. In other cases, the granularity indication component 1140 may transmit, to the UE, an indication 1143 to use a frequency domain granularity for phase feedback that is smaller than a frequency domain granularity for amplitude feedback. Granularity indicator 1140 may send an indication 1142 of whether a frequency domain granularity for phase feedback is smaller than a frequency domain granularity for amplitude feedback to precoding procedure performer 1115. Granularity indicator 1140 may receive an indication 1118 to use a frequency domain granularity for phase feedback that is smaller than a frequency domain granularity from precoding procedure performer 1115.

The configuration transmitter 1145 may transmit, to the UE, a configuration 1147 to implement differential phase feedback, where the receiving the indication of the second set of bits is based on the configuration to implement differential phase feedback. In some cases, the configuration is transmitted in RRC signaling, MAC CE signaling, or a combination thereof. Configuration transmitter 1145 may receive a configuration 1117 to implement differential phase feedback from precoding procedure performer 1115.

Figure 12:
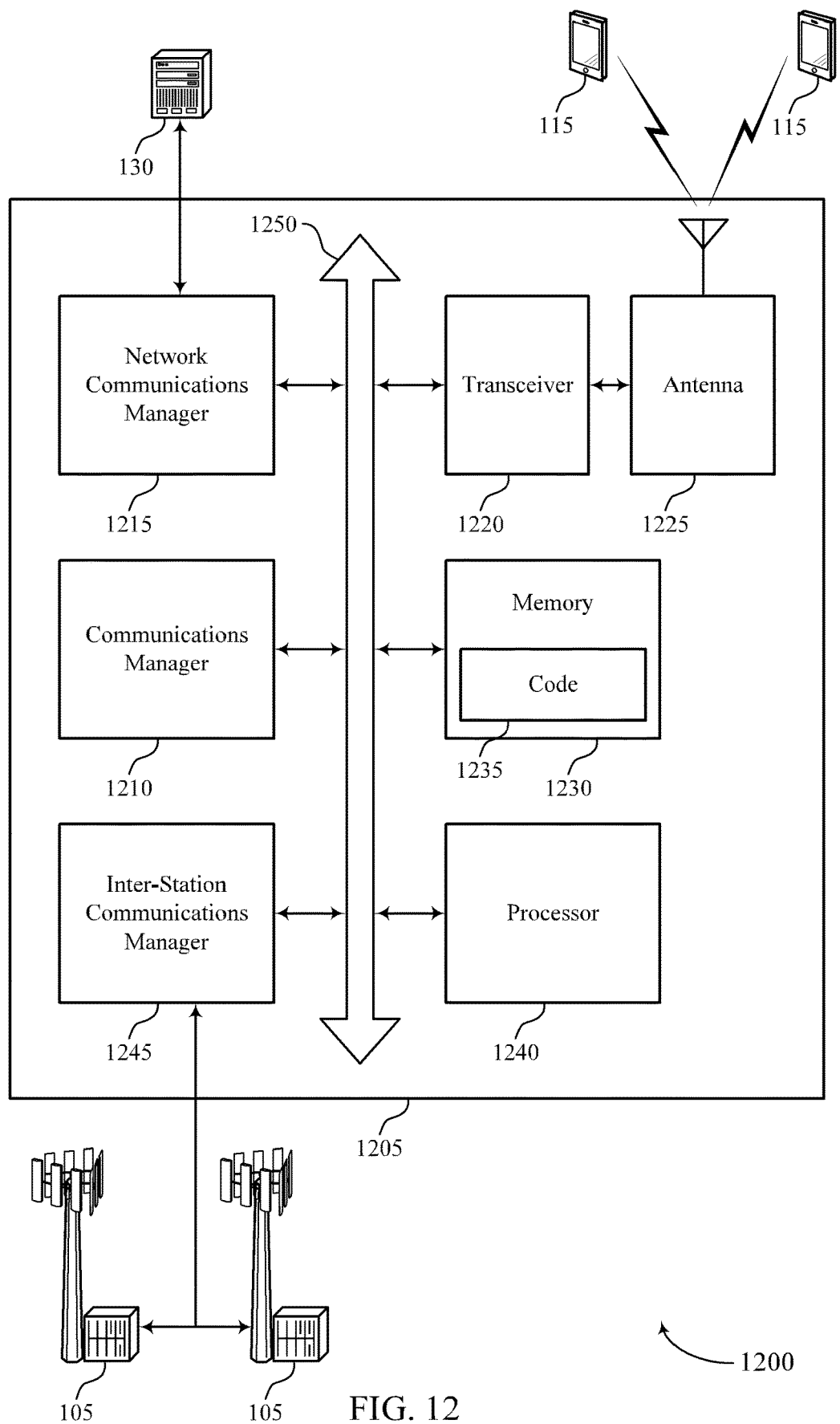
FIG. 12 shows a diagram of a system including a device that supports codebook design with differential phase feedback in a frequency domain in accordance with aspects of the present disclosure.

FIG. 12 shows a diagram of a system 1200 including a device 1205 that supports codebook design with differential phase feedback in a frequency domain in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, an indication of a first set of bits and a second set of bits, where the first set of bits indicates, for a beam of a set of beams, an absolute phase value for a first sub-band of a sub-band group and the second set of bits indicates differential phase values for one or more additional sub-bands of the sub-band group, where the sub-band group includes the first sub-band and the one or more additional sub-bands. The communications manager 1210 additionally may perform a precoding procedure for the set of beams using at least the first set of bits, the second set of bits, and a beam combination codebook and may communicate with the UE according to the precoding procedure.

The network communications manager 1215 may manage communications with the core network 130 (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting codebook design with differential phase feedback in a frequency domain).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
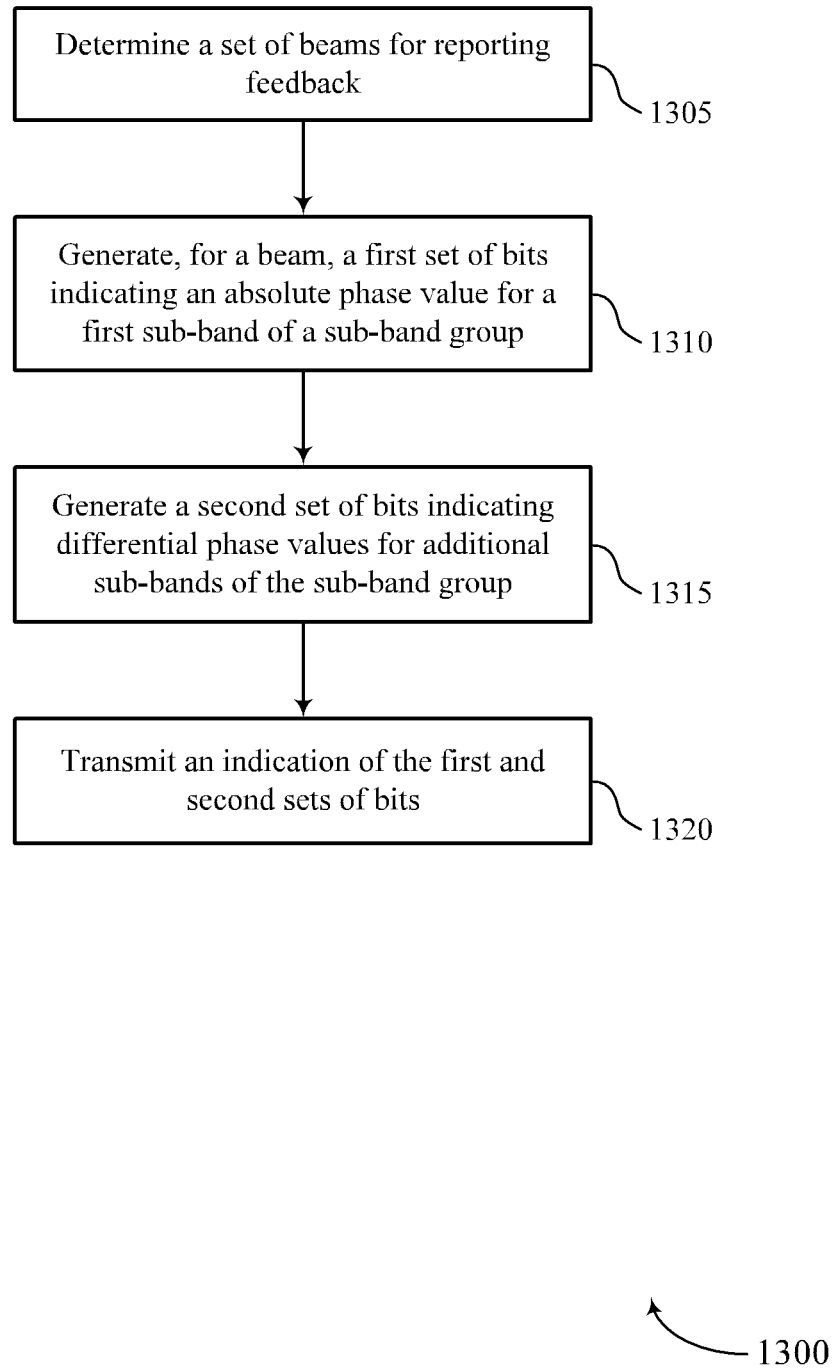
FIGS. 13 through 17 show flowcharts illustrating methods that support codebook design with differential phase feedback in a frequency domain in accordance with aspects of the present disclosure.

FIG. 13 shows a flowchart illustrating a method 1300 that supports codebook design with differential phase feedback in a frequency domain in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may determine a set of beams for reporting feedback according to a beam combination codebook for precoding by a base station. The UE may select beams for the set of beams that are orthogonal to each other or may identify the beams from a table stored at the UE. Additionally or alternatively, the UE may select beams based on beam measurements of multiple beams (e.g., multiple DFT beams). The operations of 1305 may be performed according to the methods described herein. In some examples, aspects of the operations of 1305 may be performed by a beam determiner 620 or 710 as described with reference to FIGS. 5 through 8.

At 1310, the UE may generate, for a beam of the set of beams, a first set of bits indicating an absolute phase value for a first sub-band of a sub-band group, where the sub-band group includes the first sub-band and one or more additional sub-bands. Generating the first set of bits may involve identifying a number of bits to use for the first set of bits and determining a beam combining coefficient for the first sub-band. A base station (e.g., the base station of 1320) may use the beam combining coefficient to determine a precoding matrix entry associated with the first sub-band. The operations of 1310 may be performed according to the methods described herein. In some examples, aspects of the operations of 1310 may be performed by an absolute phase value bit generator 625 or 715 as described with reference to FIGS. 5 through 8.

At 1315, the UE may generate, for the beam of the set of beams, a second set of bits indicating differential phase values for the one or more additional sub-bands of the sub-band group. Generating the second set of bits may involve identifying a number of bits to use for the second set of bits, determining one or more beam combining coefficients for the additional sub-bands (e.g., one for each of the additional sub-bands), and determining a difference between the beam combining coefficient for first sub-band and the one or more beam combining coefficients for the additional sub-bands. A base station (e.g., the base station of 1320) may use the one or more beam combining coefficients for the additional sub-bands to determine precoding matrix entries associated with the additional sub-bands. The operations of 1315 may be performed according to the methods described herein. In some examples, aspects of the operations of 1315 may be performed by a differential phase value bit generator 630 or 720 as described with reference to FIGS. 5 through 8.

At 1320, the UE may transmit, to the base station, an indication of the first set of bits and the second set of bits. Transmitting the indications of first and second sets of bits may involve converting the first and second sets of bits to a signal at a radio frequency and transmitting the signal over one or more antennas of the UE. The operations of 1320 may be performed according to the methods described herein. In some examples, aspects of the operations of 1320 may be performed by a bit indication transmitter 635 or 725 as described with reference to FIGS. 5 through 8.

Figure 14:
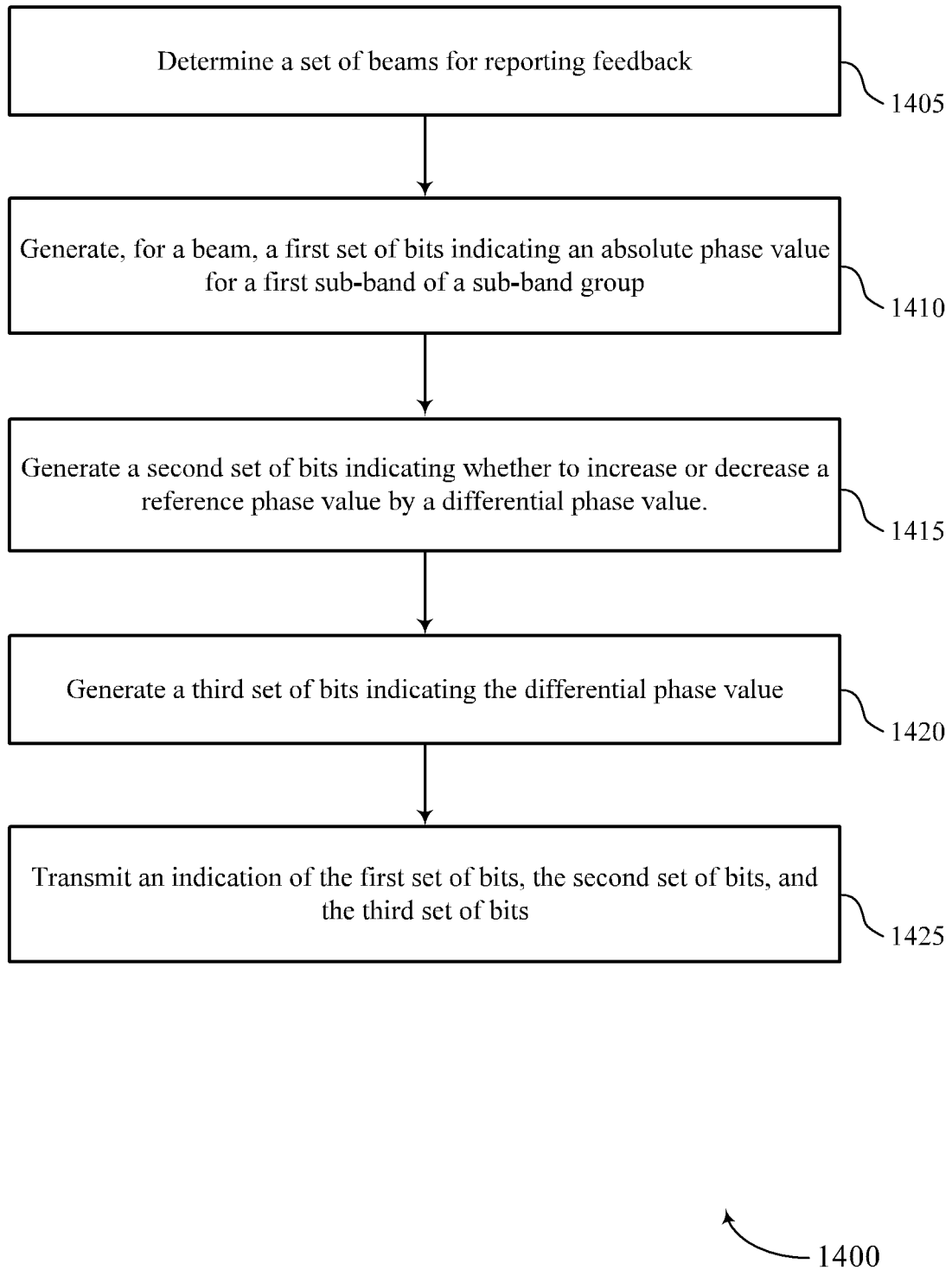

FIG. 14 shows a flowchart illustrating a method 1400 that supports codebook design with differential phase feedback in a frequency domain in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may determine a set of beams for reporting feedback according to a beam combination codebook for precoding by a base station. The UE may select beams for the set of beams that are orthogonal to each other or may identify the beams from a table stored at the UE. The operations of 1405 may be performed according to the methods described herein. In some examples, aspects of the operations of 1405 may be performed by a beam determiner 620 or 710 as described with reference to FIGS. 5 through 8.

At 1410, the UE may generate, for a beam of the set of beams, a first set of bits indicating an absolute phase value for a first sub-band of a sub-band group, where the sub-band group includes the first sub-band and one or more additional sub-bands. Generating the first set of bits may involve identifying a number of bits to use for the first set of bits and determining a beam combining coefficient for the first sub-band. A base station (e.g., the base station of 1425) may use the beam combining coefficient to determine a precoding matrix entry associated with the first sub-band. The operations of 1410 may be performed according to the methods described herein. In some examples, aspects of the operations of 1410 may be performed by an absolute phase value bit generator 625 or 715 as described with reference to FIGS. 5 through 8.

At 1415, the UE may generate a second set of bits indicating differential phase values for the one or more additional sub-bands of the sub-band group, where the second set of bits includes, for each sub-band of the one or more additional sub-bands, one bit indicating whether to increase or decrease a reference phase value by a differential phase value to determine a phase value for the each sub-band. Generating the second set of bits may involve identifying a number of bits to use for the second set of bits, determining one or more beam combining coefficients for the additional sub-bands (e.g., one for each of the additional sub-bands), and determining a difference between the beam combining coefficient for first sub-band and the one or more beam combining coefficients for the additional sub-bands. A base station (e.g., the base station of 1425) may use the one or more beam combining coefficients for the additional sub-bands to determine precoding matrix entries associated with the additional sub-bands. The operations of 1415 may be performed according to the methods described herein. In some examples, aspects of the operations of 1415 may be performed by a differential phase value bit generator 630 or 720 as described with reference to FIGS. 5 through 8.

At 1420, the UE may generate a third set of bits indicating the differential phase value. Generating the third set of bits may involve determining an increment between phase values. The operations of 1420 may be performed according to the methods described herein. In some examples, aspects of the operations of 1420 may be performed by a differential phase value bit generator 630 or 720 as described with reference to FIGS. 5 through 8.

At 1425, the UE may transmit, to the base station, an indication of the first set of bits, the second set of bits, and the third set of bits. Transmitting the indications of the first, second, and third sets of bits may involve converting the first, second, and third sets of bits to a signal at a radio frequency and transmitting the signal over one or more antennas of the UE. The operations of 1425 may be performed according to the methods described herein. In some examples, aspects of the operations of 1425 may be performed by a bit indication transmitter 635 or 725 as described with reference to FIGS. 5 through 8.

Figure 15:
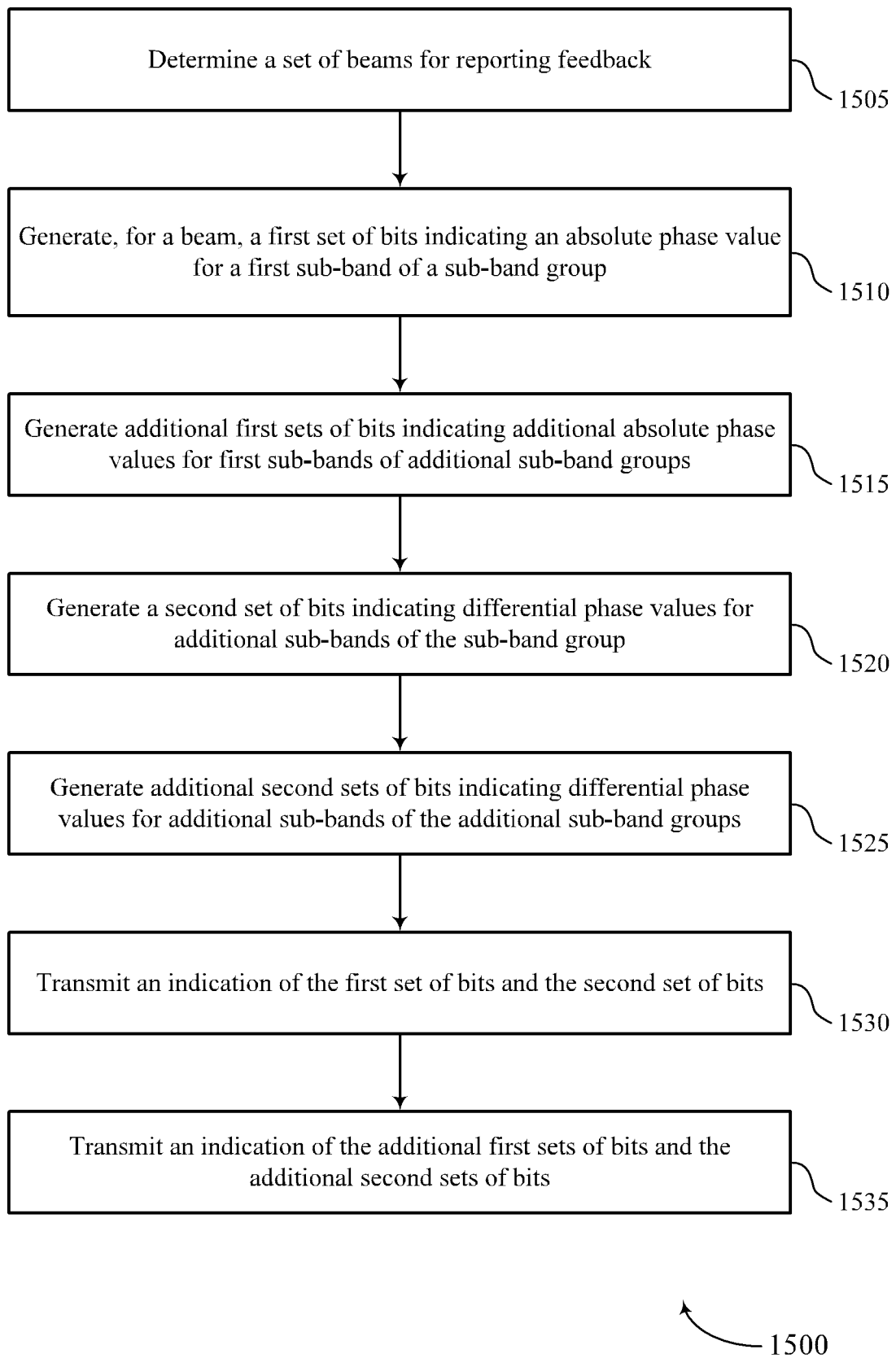

FIG. 15 shows a flowchart illustrating a method 1500 that supports codebook design with differential phase feedback in a frequency domain in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may determine a set of beams for reporting feedback according to a beam combination codebook for precoding by a base station. The UE may select beams for the set of beams that are orthogonal to each other or may identify the beams from a table stored at the UE. The operations of 1505 may be performed according to the methods described herein. In some examples, aspects of the operations of 1505 may be performed by a beam determiner 620 or 710 as described with reference to FIGS. 5 through 8.

At 1510, the UE may generate, for a beam of the set of beams, a first set of bits indicating an absolute phase value for a first sub-band of a sub-band group, where the sub-band group includes the first sub-band and one or more additional sub-bands. Generating the first set of bits may involve identifying a number of bits to use for the first set of bits and determining a beam combining coefficient for the first sub-band. A base station (e.g., the base station of 1530) may use the beam combining coefficient to determine a precoding matrix entry associated with the first sub-band. The operations of 1510 may be performed according to the methods described herein. In some examples, aspects of the operations of 1510 may be performed by an absolute phase value bit generator 625 or 715 as described with reference to FIGS. 5 through 8.

At 1515, the UE may generate one or more additional first sets of bits indicating additional absolute phase values for first sub-bands of one or more additional sub-band groups of a set of sub-band groups. Generating the one or more additional first sets of bits may involve identifying a number of bits for each first sets of bits and determining beam combining coefficients for the corresponding first sub-bands. A base station (e.g., the base station of 1535) may use the beam combining coefficients to determine precoding matrix entries associated with the first sub-bands. The operations of 1515 may be performed according to the methods described herein. In some examples, aspects of the operations of 1515 may be performed by an absolute phase value bit generator 625 or 715 as described with reference to FIGS. 5 through 8.

At 1520, the UE may generate a second set of bits indicating differential phase values for the one or more additional sub-bands of the sub-band group. Generating the second set of bits may involve identifying a number of bits to use for the second set of bits, determining one or more beam combining coefficients for the additional sub-bands (e.g., one for each of the additional sub-bands), and determining a difference between the beam combining coefficient for first sub-band and the one or more beam combining coefficients for the additional sub-bands. A base station (e.g., the base station of 1530) may use the one or more beam combining coefficients for the additional sub-bands to determine precoding matrix entries associated with the additional sub-bands. The operations of 1520 may be performed according to the methods described herein. In some examples, aspects of the operations of 1520 may be performed by a differential phase value bit generator 630 or 720 as described with reference to FIGS. 5 through 8.

At 1525, the UE may generate one or more additional second sets of bits indicating differential phase values for additional sub-bands of the one or more additional sub-band groups of the set of sub-band groups. Generating the one or more additional second sets of bits may involve identifying a number of bits to use for the one or more additional second sets of bits, determining beam combining coefficients for the additional sub-bands (e.g., one for each of the additional sub-bands), and determining a difference between the beam combining coefficients for first sub-band and the beam combining coefficients for the additional sub-bands. A base station (e.g., the base station of 1535) may use the one or more beam combining coefficients for the additional sub-bands to determine precoding matrix entries associated with the additional sub-bands. The operations of 1525 may be performed according to the methods described herein. In some examples, aspects of the operations of 1525 may be performed by a differential phase value bit generator 630 or 720 as described with reference to FIGS. 5 through 8.

At 1530, the UE may transmit, to the base station, an indication of the first set of bits and the second set of bits. Transmitting the indications of the first and second sets of bits may involve converting the first and second sets of bits to a signal at a radio frequency and transmitting the signal over one or more antennas of the UE. The operations of 1530 may be performed according to the methods described herein. In some examples, aspects of the operations of 1530 may be performed by a bit indication transmitter 635 or 725 as described with reference to FIGS. 5 through 8.

At 1535, the UE may transmit, to the base station, an indication of the one or more additional first sets of bits and the one or more additional second sets of bits. Transmitting the indications of the one or more first sets of bits and the one or more second sets of bits may involve converting the one or more first sets of bits and the one or more second sets of bits to a signal at a radio frequency and transmitting the signal over one or more antennas of the UE. The operations of 1535 may be performed according to the methods described herein. In some examples, aspects of the operations of 1535 may be performed by a bit indication transmitter 635 or 725 as described with reference to FIGS. 5 through 8.

Figure 16:
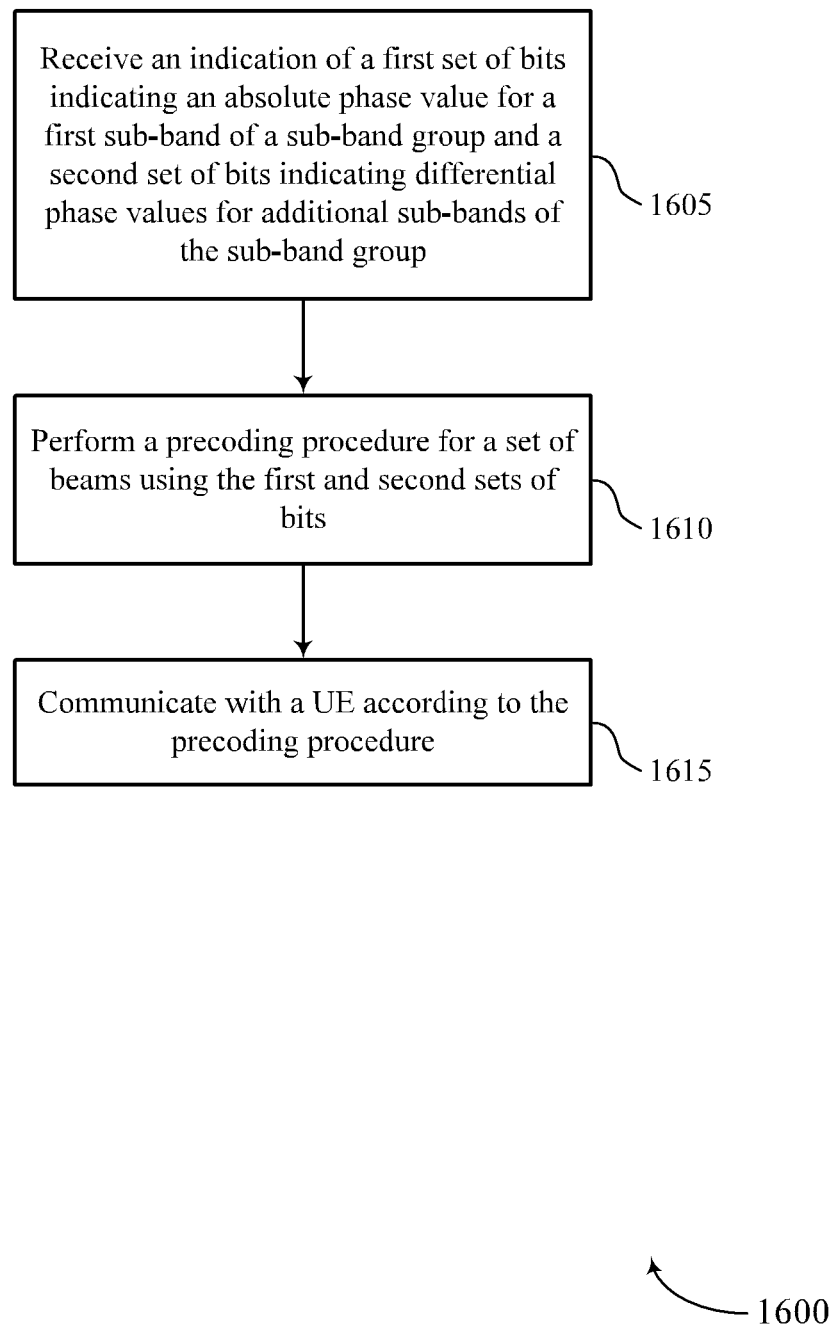

FIG. 16 shows a flowchart illustrating a method 1600 that supports codebook design with differential phase feedback in a frequency domain in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive, from a UE, an indication of a first set of bits and a second set of bits, where the first set of bits indicates, for a beam of a set of beams, an absolute phase value for a first sub-band of a sub-band group and the second set of bits indicates, for the beam of the set of beams, differential phase values for one or more additional sub-bands of the sub-band group, where the sub-band group includes the first sub-band and the one or more additional sub-bands. Receiving the indications of the first and second sets of bits may involve converting a radio frequency signal received at one or more antennas of the base station to the first and second sets of bits. The operations of 1605 may be performed according to the methods described herein. In some examples, aspects of the operations of 1605 may be performed by a bit indication receiver 1020 or 1110 as described with reference to FIGS. 9 through 12.

At 1610, the base station may perform a precoding procedure for the set of beams using at least the first set of bits, the second set of bits, and a beam combination codebook. Performing the precoding procedure may involve determining a beam combining coefficient for the first sub-band and a corresponding entry of a precoding matrix from the absolute phase value. Additionally, performing the precoding procedure may involve determining beam combining coefficients for the additional sub-bands and corresponding entries of the precoding matrix from the differential phase values. The operations of 1610 may be performed according to the methods described herein. In some examples, aspects of the operations of 1610 may be performed by a precoding procedure performer 1025 or 1115 as described with reference to FIGS. 9 through 12.

At 1615, the base station may communicate with the UE according to the precoding procedure. Communicating according to the precoding procedure may involve communicating over one or more beams trained using the precoding procedure. The operations of 1615 may be performed according to the methods described herein. In some examples, aspects of the operations of 1615 may be performed by a communication component 1030 or 1120 as described with reference to FIGS. 9 through 12.

Figure 17:
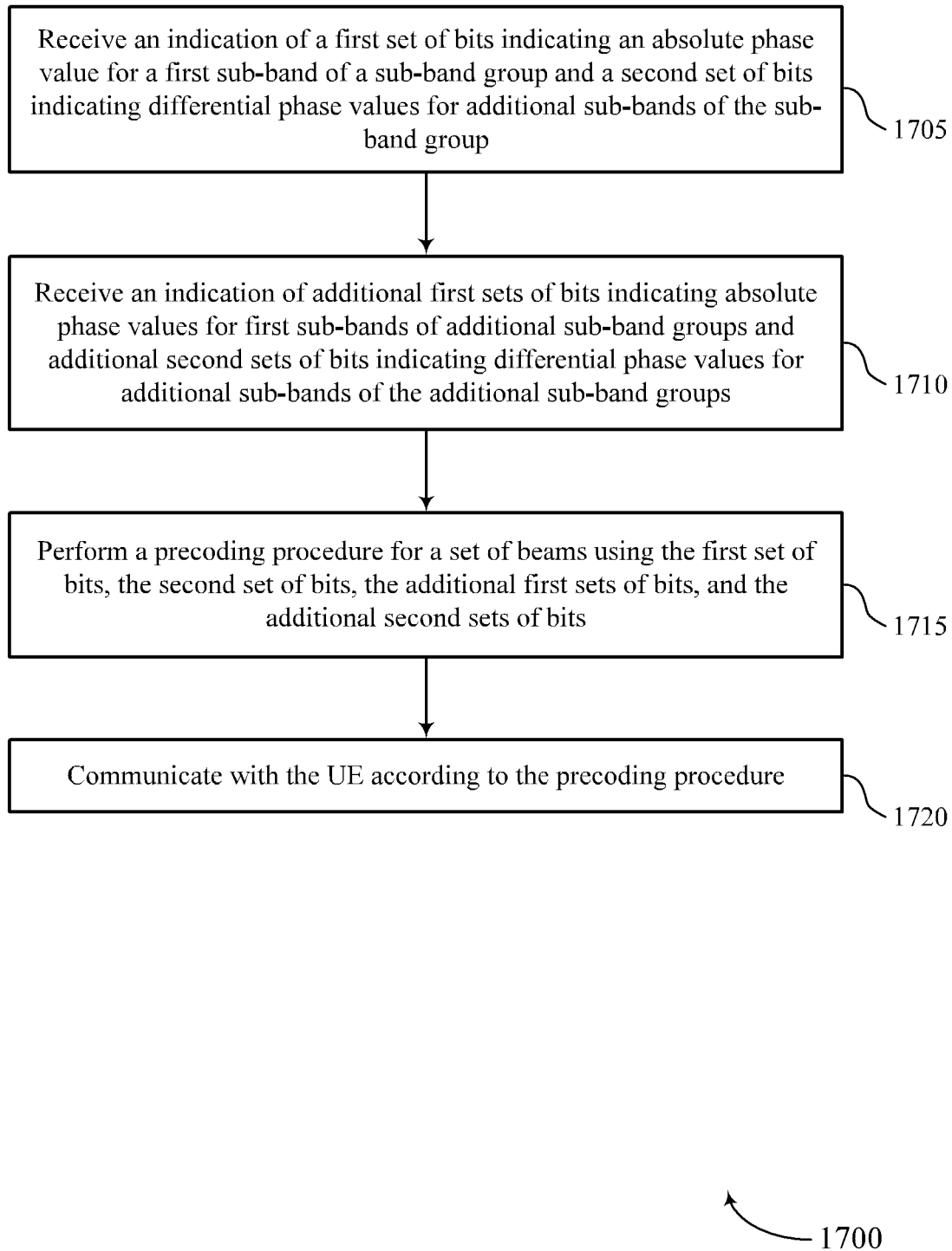

FIG. 17 shows a flowchart illustrating a method 1700 that supports codebook design with differential phase feedback in a frequency domain in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, an indication of a first set of bits and a second set of bits, where the first set of bits indicates, for a beam of a set of beams, an absolute phase value for a first sub-band of a sub-band group and the second set of bits indicates differential phase values for one or more additional sub-bands of the sub-band group, where the sub-band group includes the first sub-band and the one or more additional sub-bands. Receiving the indications of the first and second sets of bits may involve converting a radio frequency signal received at one or more antennas of the base station to the first and second sets of bits. The operations of 1705 may be performed according to the methods described herein. In some examples, aspects of the operations of 1705 may be performed by a bit indication receiver 1020 or 1110 as described with reference to FIGS. 9 through 12.

At 1710, the base station may receive, from the UE, an indication of one or more additional first sets of bits and one or more additional second sets of bits, where the one or more additional first sets of bits indicate additional absolute phase values for first sub-bands of one or more additional sub-band groups of a set of sub-band groups and the one or more additional second sets of bits indicate differential phase values for additional sub-bands of the one or more additional sub-band groups of the set of sub-band groups. Receiving the indications of the one or more first sets of bits and the one or more second sets of bits may involve converting a radio frequency signal received at one or more antennas of the base station to the one or more first sets of bits and the one or more second sets of bits. The operations of 1710 may be performed according to the methods described herein. In some examples, aspects of the operations of 1710 may be performed by a bit indication receiver 1020 or 1110 as described with reference to FIGS. 9 through 12.

At 1715, the base station may perform a precoding procedure for the set of beams using the first set of bits, the second set of bits, the additional first sets of bits, the one or more additional second sets of bits, and a beam combination codebook. Performing the precoding procedure may involve determining beam combining coefficients for the first sub-band of the sub-band group and the first sub-bands of the set of sub-band groups and corresponding entries of a precoding matrix from the absolute phase values associated with the first sub-band and the first sub-bands. Additionally, performing the precoding procedure may involve determining beam combining coefficients for the additional sub-bands of the sub-band group and the set of sub-band groups and corresponding entries of the precoding matrix from the differential phase values for the additional sub-bands of the sub-band group and the set of sub-band groups. The operations of 1715 may be performed according to the methods described herein. In some examples, aspects of the operations of 1715 may be performed by a precoding procedure performer 1025 or 1115 as described with reference to FIGS. 9 through 12.

At 1720, the base station may communicate with the UE according to the precoding procedure. Communicating according to the precoding procedure may involve communicating over one or more beams trained using the precoding procedure. The operations of 1720 may be performed according to the methods described herein. In some examples, aspects of the operations of 1720 may be performed by a communication component 1030 or 1120 as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    determining a set of beams for reporting feedback according to a beam combination codebook for precoding by a base station;
    generating, for a beam of the set of beams, a first set of bits indicating an absolute phase value for a first sub-band of a sub-band group, wherein the sub-band group comprises the first sub-band and two or more additional sub-bands;
    generating a second set of bits indicating differential phase values for the two or more additional sub-bands of the sub-band group, wherein the second set of bits comprises, for each sub-band of the two or more additional sub-bands, one bit indicating whether to increase or decrease a reference phase value by a differential phase value to determine a phase value for the each sub-band, and wherein, for each of the two or more additional sub-bands, the reference phase value comprises the absolute phase value; and
    transmitting, to the base station, an indication of the first set of bits and the second set of bits.

2. The method of claim 1, further comprising:
    generating a third set of bits indicating the differential phase value; and transmitting, to the base station, an indication of the third set of bits.

3. The method of claim 1, further comprising:
transmitting, to the base station, an indication of whether the reference phase value comprises the absolute phase value for the first sub-band or a phase value for an adjacent sub-band in the sub-band group.

4. The method of claim 1, further comprising:
generating one or more additional first sets of bits indicating additional absolute phase values for first sub-bands of one or more additional sub-band groups of a plurality of sub-band groups;
generating one or more additional second sets of bits indicating differential phase values for additional sub-bands of the one or more additional sub-band groups of the plurality of sub-band groups; and
transmitting, to the base station, an indication of the one or more additional first sets of bits and the one or more additional second sets of bits.

5. The method of claim 4, further comprising:
transmitting, to the base station, an indication of a number of sub-band groups in the plurality of sub-band groups.

6. The method of claim 5, wherein the indication of the number of sub-band groups comprises a bit field indicating either one sub-band group or a plurality of sub-band groups, wherein a sub-band group size of the plurality of sub-band groups relative to a bandwidth part size is based at least in part on a value of the bit field.

7. The method of claim 4, wherein a number of sub-band groups in the plurality of sub-band groups is configured by the base station.

8. The method of claim 4, further comprising:
calculating a set of phase values for a set of resource blocks corresponding to a frequency region;
calculating differences in the phase values for resource blocks in the set of resource blocks; and
selecting a number of sub-band groups in the plurality of sub-band groups based at least in part on the calculated differences in the phase values and a phase difference threshold.

9. The method of claim 1, further comprising:
transmitting, to the base station, an indication of whether a frequency domain granularity for phase feedback is smaller than a frequency domain granularity for amplitude feedback.

10. The method of claim 1, wherein the first sub-band is a lowest frequency sub-band of the sub-band group or a highest frequency sub-band of the sub-band group.

11. The method of claim 1, wherein the first sub-band is subsequent to a first subset of the two or more additional sub-bands according to an order of sub-band indices for the sub-band group, and wherein a second subset of the two or more additional sub-bands are subsequent to the first sub-band according to the order of the sub-band indices for sub-band group, and wherein a difference between a number of sub-bands in the first subset and a number of sub-bands in the second subset is no more than one.

12. A method for wireless communications at a base station, comprising:
receiving, from a user equipment (UE), an indication of a first set of bits and a second set of bits, wherein the first set of bits indicates, for a beam of a set of beams, an absolute phase value for a first sub-band of a sub-band group and the second set of bits indicates differential phase values for two or more additional sub-bands of the sub-band group, wherein the sub-band group comprises the first sub-band and the two or more additional sub-bands, wherein the second set of bits comprises, for each sub-band of the two or more additional sub-bands, one bit indicating whether to increase or decrease a reference phase value by a differential phase value to determine a phase value for the each sub-band, and wherein, for each of the two or more additional sub-bands, the reference phase value comprises the absolute phase value;
performing a precoding procedure for the set of beams using at least the first set of bits, the second set of bits, and a beam combination codebook; and
communicating with the UE according to the precoding procedure.

13. The method of claim 12, further comprising:
receiving, from the UE, an indication of a third set of bits indicating the differential phase value, wherein the precoding procedure is performed based at least in part on the differential phase value.

14. The method of claim 12, further comprising:
receiving, from the UE, an indication of whether the reference phase value comprises the absolute phase value for the first sub-band or a phase value for an adjacent sub-band in the sub-band group.

15. The method of claim 12, further comprising:
receiving, from the UE, an indication of one or more additional first sets of bits and one or more additional second sets of bits, wherein the one or more additional first sets of bits indicate additional absolute phase values for first sub-bands of one or more additional sub-band groups of a plurality of sub-band groups and the one or more additional second sets of bits indicate differential phase values for additional sub-bands of the one or more additional sub-band groups of the plurality of sub-band groups.

16. The method of claim 15, further comprising:
receiving, from the UE, an indication of a number of sub-band groups in the plurality of sub-band groups.

17. The method of claim 16, wherein the indication of the number of sub-band groups comprises a bit field indicating either one sub-band group or a plurality of sub-band groups, wherein a sub-band group size relative to a bandwidth part size is based at least in part on a value of the bit field.

18. The method of claim 15, further comprising:
transmitting, to the UE, a configuration of a number of sub-band groups in the plurality of sub-band groups.

19. The method of claim 12, wherein the first sub-band is a lowest frequency sub-band of the sub-band group or a highest frequency sub-band of the sub-band group.

20. The method of claim 12, wherein the first sub-band is subsequent to a first subset of the two or more additional sub-bands according to an order of sub-band indices for sub-band group, and wherein a second subset of the two or more additional sub-bands are subsequent to the first sub-band according to the order of the sub-band indices for sub-band group, and wherein a difference between a number of sub-bands in the first subset and a number of sub-bands in the second subset is no more than one.

21. An apparatus for wireless communications at a user equipment (UE), comprising:
a processor;
memory in electronic communication with the processor; and
instructions stored in the memory and executable by the processor to cause the apparatus to:
determine a set of beams for reporting feedback according to a beam combination codebook for precoding by a base station;

generate, for a beam of the set of beams, a first set of bits indicating an absolute phase value for a first sub-band of a sub-band group, wherein the sub-band group comprises the first sub-band and two or more additional sub-bands;

generate a second set of bits indicating differential phase values for the two or more additional sub-bands of the sub-band group, wherein the second set of bits comprises, for each sub-band of the two or more additional sub-bands, one bit indicating whether to increase or decrease a reference phase value by a differential phase value to determine a phase value for the each sub-band, and wherein, for each of the two or more additional sub-bands, the reference phase value comprises the absolute phase value; and transmit, to the base station, an indication of the first set of bits and the second set of bits.

22. An apparatus for wireless communications at a base station, comprising:

a processor;

memory in electronic communication with the processor; and instructions stored in the memory and executable by the processor to cause the apparatus to:

receive, from a user equipment (UE), an indication of a first set of bits and a second set of bits, wherein the first set of bits indicates, for a beam of a set of beams, an absolute phase value for a first sub-band of a sub-band group and the second set of bits indicates differential phase values for two or more additional sub-bands of the sub-band group, wherein the sub-band group comprises the first sub-band and the two or more additional sub-bands, wherein the second set of bits comprises, for each sub-band of the two or more additional sub-bands, one bit indicating whether to increase or decrease a reference phase value by a differential phase value to determine a phase value for the each sub-band, and wherein, for each of the two or more additional sub-bands, the reference phase value comprises the absolute phase value;

perform a precoding procedure for the set of beams using at least the first set of bits, the second set of bits, and a beam combination codebook; and communicate with the UE according to the precoding procedure.

\* \* \* \* \*